US010935776B2

(12) United States Patent
Waller et al.

(10) Patent No.: US 10,935,776 B2
(45) Date of Patent: Mar. 2, 2021

(54) THREE-DIMENSIONAL SCANLESS HOLOGRAPHIC OPTOGENETICS WITH TEMPORAL FOCUSING

(71) Applicant: THE REGENTS OF THE UNIVERSITY OF CALIFORNIA, Oakland, CA (US)

(72) Inventors: Laura Waller, Berkeley, CA (US); Hillel Adesnik, Kensington, CA (US); Nicolas C. Pégard, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 92 days.

(21) Appl. No.: 16/255,557

(22) Filed: Jan. 23, 2019

(65) Prior Publication Data

US 2019/0227490 A1 Jul. 25, 2019

Related U.S. Application Data

(60) Provisional application No. 62/620,601, filed on Jan. 23, 2018.

(51) Int. Cl.
*G02B 21/06* (2006.01)

(52) U.S. Cl.
CPC .................................... *G02B 21/06* (2013.01)

(58) Field of Classification Search
CPC .. G03H 1/0443; G03H 1/2249; G03H 1/2286; G03H 1/2294; G03H 1/0005; G03H 1/0866; G03H 2210/30; G03H 2222/16; G03H 2222/14; G03H 2222/33; G03H 2001/005; G03H 2223/23; G03H 2001/0077; G03H 2001/2213; G03H 2001/0216; G03H 2223/13; G03H 2001/0883; G06N 3/0675; G06N 3/061; G02B 21/06
See application file for complete search history.

(56) References Cited

PUBLICATIONS

Adesnik, Hillel, "New tools and insights into cortical circuits", UC Berkeley, Department of Molecular and Cell Biology and Helen Wills Neuroscience Institute, Seminar Presentation at New York University, New York, NY, USA, Oct. 27, 2016, 26 pages (slides).
Brian, Roy et al., "Neuronal cell loss accompanies the brain tissue response to chronically implanted silicon microelectrode arrays," Experimental neurology 195, 115-126 (2005).

(Continued)

*Primary Examiner* — Wen Huang
(74) *Attorney, Agent, or Firm* — O'Banion & Ritchey LLP; John P. O'Banion

(57) ABSTRACT

Apparatus and methods for 3D-Scanless Holographic Optogenetics with Temporal focusing (3D-SHOT), which allows precise, simultaneous photo-activation of arbitrary sets of neurons anywhere within the addressable volume of the microscope. Soma-targeted (ST) optogenetic tools, ST-ChroME and IRES-ST-eGtACR 1, optimized for multiphoton activation and suppression are also provided. The methods use point-cloud holography to place multiple copies of a temporally focused disc matching the dimensions of a designated neuron's cell body. Experiments in cultured cells, brain slices, and in living mice demonstrate single-neuron spatial resolution even when optically targeting randomly distributed groups of neurons in 3D.

8 Claims, 6 Drawing Sheets

Specification includes a Sequence Listing.

(56) References Cited

PUBLICATIONS

Nagel, Georg et al. "Channelrhodopsin-1 a light-gated proton channel in green algae," Science 296, 2395-2398 (2002).
Kravitz, Alexxai et al., "Regulation of parkinsonian motor behaviours by optogenetic control of basal ganglia circuitry," Nature 466, 622-626 (2010).
Rickgauer, John et al., "Two-photon excitation of channelrhodopsin-2 at saturation," Proceedings of the National Academy of Sciences 106, 15,025-15,030 (2009).
Grewe, Benjamin et al., "Fast two-layer two-photon imaging of neuronal cell populations using an electrically tunable lens," Biomedical optics express 2, 2035-2046 (2011).
Ready, Gaddum et al., "Three-dimensional random access multiphoton microscopy for functional imaging of neuronal activity," Nature neuroscience 11, 713-720 (2008).
Anselmi, Francesca et al., "Three-dimensional imaging and photostimulation by remote-focusing and holographic light patterning," Proceedings of the National Academy of Sciences 108, 19,504-19,509 (2011).
Dal Maschio, Franco et al., "Simultaneous two-photon imaging and photo-stimulation with structured light illumination," Optics express 18, 18,720-18,731 (2010).
Zhu, Guanghao et al., "Simultaneous spatial and temporal focusing of femtosecond pulses," Opt. Express 13, 2153-2159 (2005).
McCabe, David et al., "Spatio-temporal focusing of an ultrafast pulse through a multiply scattering medium," Nature communications 2, 447 (2011).
Papagiakoumou, Eirini et al., "Temporal focusing with spatially modulated excitation," Optics express 17, 5391-5401 (2009).
Hernandez, Oscar et al., "Three-dimensional spatiotemporal focusing of holographic patterns," Nature communications 7 (2016).

SEQUENCE LISTING

<160> NUMBER OF SEQ ID NOS: 3

<210> SEQ ID NO 1
<211> LENGTH: 7794
<212> TYPE: DNA
<213> ORGANISM: mouse

<400> SEQUENCE: 1
ggtcgacatt gattattgac tagttattaa tagtaatcaa ttacggggtc attagttcat 60
agcccatata tggagttccg cgttacataa cttacggtaa atggcccgcc tggctgaccg 120
cccaacgacc cccgcccatt gacgtcaata atgacgtatg ttcccatagt aacgccaata 180

```
gggactttcc attgacgtca atgggtggag tatttacggt aaactgccca cttggcagta    240
catcaagtgt atcatatgcc aagtacgccc cctattgacg tcaatgacgg taaatggccc    300
gcctggcatt atgcccagta catgacctta tgggactttc ctacttggca gtacatctac    360
gtattagtca tcgctattac catggtcgag gtgagcccca cgttctgctt cactctcccc    420
atctcccccc cctccccacc cccaattttg tatttattta ttttttaatt attttgtgca    480
gcgatggggg cggggggggg gggggcgcgc gccrggsggg gcggggsggg gcggggggsg    540
gggsggggcg aggcggagag gtgcggcggc agccaatcag agcggcgcgc tccgaaagtt    600
tccttttatg gcgaggcggc ggcggcggcg gccctataaa aagcgaagcg cgcggcgggc    660
gggagtcgct gcgcgctgcc ttcgccccgt gccccgctcc gccgccgcct cgcgccgccc    720
gccccggctc tgactgaccg cgttactccc acaggtgagc gggcgggacg gcccttctcc    780
tccgggctgt aattagcgct tggtttaatg acggcttgtt tcttttctgt ggctgcgtga    840
aagccttgag gggctccggg agggcccttt gtgcgggggg agcggctcgg ggggtgcgtg    900
cgtgtgtgtg tgcgtgggga gcgccgcgtg cggctccgcg ctgcccggcg gctgtgagcg    960
ctgcgggcgc ggcgcggggc tttgtgcgct ccgcagtgtg cgcgagggga gcgcggccgg   1020
gggcggtgcc ccgcggtgcg gggggggctg cgaggggaac aaaggctgcg tgcggggtgt   1080
gtgcgtgggg gggtgagcag ggggtgtggg cgcgtcggtc gggctgcaac ccccccctgca  1140
ccccccctccc cgagttgctg agcacggccc ggcttcgggt gcggggctcc gtacggggcg   1200
tggcgcgggg ctcgccgtgc cgggcggggg gtggcggcag gtgggggtgc cgggcggggc   1260
ggggccgcct cgggccgggg agggctcggg ggaggggcgc ggcggccccc ggagcgccgg   1320
cggctgtcga ggcgcggcga gccgcagcca ttgcctttta tggtaatcgt gcgagagggc   1380
gcagggactt cctttgtccc aaatctgtgc ggagccgaaa tctgggaggc gccgccgcac   1440
cccctctagc gggcgcgggg cgaagcggtg cggcgccggc aggaaggaaa tgggcgggga   1500
gggccttcgt gcgtcgccgc gccgccgtcc ccttctccct ctccagcctc ggggctgtcc   1560
gcggggggac ggctgccttc ggggggggacg gggcagggcg gggttcggct tctggcgtgt  1620
gaccggcggc tctagagcct ctgctaacca tgttcatgcc ttcttctttt tcctacagct   1680
cctgggcaac gtgctggtta ttgtgctgtc tcatcatttt ggcaaagaat tcggtaccgc   1740
gggcccggga tccaccggtg ctagtatgga aacagccgcc acaatgaccc acgcctttat   1800
ctcagccgtg cctagcgccg aagccacaat tagaggcctg ctgagcgccg cagcagtggt   1860
gacaccagca gcagacgctc acggagaaac ctctaacgcc acaacagccg gagccgatca   1920
cggttgcttc ccccacatca accacggaac cgagctgcag cacaagatcg cagtgggact   1980
ccagtggttc accgtgatcg tggctatcgt gcagctcatc ttctacggtt ggcacagctt   2040
caaggccaca accggctggg aggaggtcta cgtctgcgtg atcgagctcg tcaagtgctt   2100
catcgagctg ttccacgagg tcgacagccc agccacagtg taccagacca acggaggagc   2160
cgtgatttgg ctgcggtaca gcgagtggct cctgacttgc cccgtgatcc tgatccacct   2220
gagcaacctg accggactgc acgaagagta cagcaagcgg accatgacca tcctggtgac   2280
cgacatcggc aacatcgtgt gggggatcac agccgccttt acaaagggcc ccctgaagat   2340
cctgttcttc atgatcggcc tgttctacgg cgtgacttgc ttcttccaga tcgccaaggt   2400
gtatatcgag agctaccaca ccctgcccaa aggcgtctgc cggaagattt gcaagatcat   2460
ggcctacgtc ttcttctgct cttggctgat gttccccgtg atgttcatcg ccggacacga   2520
gggactgggc ctgatcacac cttacaccag cggaatcggc cacctgatcc tggatctgat   2580
```

```
cagcaagaac acttggggct tcctgggcca ccacctgaga gtgaagatcc acgagcacat   2640
cctgatccac ggcgacatcc ggaagacaac caccatcaac gtggccggcg agaacatgga   2700
gatcgagacc ttcgtcgacg aggaggagga gggaggagtg gcggccgcac cggtaatggt   2760
gtctaagggc gaagagctga tcaaggaaaa tatgcgtatg aaggtggtca tggaaggttc   2820
ggtcaacggc caccaattca aatgcacagg tgaaggagaa ggcaatccgt acatgggaac   2880
tcaaaccatg aggatcaaag tcatcgaggg aggacccctg ccatttgcct ttgacattct   2940
tgccacgtcg ttcatgtatg gcagccgtac ttttatcaag tacccgaaag gcattcctga   3000
tttctttaaa cagtcctttc ctgagggttt tacttgggaa agagttacga gatacgaaga   3060
tggtggagtc gtcaccgtca tgcaggacac cagccttgag gatggctgtc tcgtttacca   3120
cgtccaagtc agaggggtaa actttccctc caatggtccc gtgatgcaga agaagaccaa   3180
gggttgggag cctaatacag agatgatgta tccagcagat ggtggtctga ggggatacac   3240
tcatatggca ctgaaagttg atggtggtgg ccatctgtct tgctctttcg taacaactta   3300
caggtcaaaa aagaccgtcg ggaacatcaa gatgcccggt atccatgccg ttgatcaccg   3360
cctggaaagg ttagaggaaa gtgacaatga aatgttcgta gtacaacgcg aacacgcagt   3420
tgccaagttc gccgggcttg gtggtgggat ggacgagctg tacaaggccc tagagcagtc   3480
ccagcccatc ctcaacacca aggagatggc cccgcagagc aagcctccag aggagctgga   3540
gatgagcagc atgcccagcc ccgtggcccc tctgcccgca cgcacggagg gcgtcatcga   3600
catgcggagc atgtccagca ttgacagctt catcagctgt gccacggact tccctgaagc   3660
caccagattc taaggactcg aggccgcagg taagtatcaa ggttacaaga caggtttaag   3720
gagaccaata gaaactgggc ttgtcgagac agagaagact cttgcgtttc tgataggcac   3780
ctattggtct tactgacatc cactttgcct ttctctccac aggtgtcgac aatcaacctc   3840
tggattacaa aatttgtgaa agattgactg gtattcttaa ctatgttgct ccttttacgc   3900
tatgtggata cgctgcttta atgcctttgt atcatgctat tgcttcccgt atggctttca   3960
ttttctcctc cttgtataaa tcctggttgc tgtctcttta tgaggagttg tggcccgttg   4020
tcaggcaacg tggcgtggtg tgcactgtgt ttgctgacgc aacccccact ggttggggca   4080
ttgccaccac ctgtcagctc ctttccggga ctttcgcttt ccccctccct attgccacgg   4140
cggaactcat cgccgcctgc cttgcccgct gctggacagg ggctcggctg ttgggcactg   4200
acaattccgt ggtgttgtcg gggaagctga cgtcctttcc atggctgctc gcctgtgttg   4260
ccacctggat tctgcgcggg acgtccttct gctacgtccc ttcggccctc aatccagcgg   4320
accttccttc ccgcggcctg ctgccggctc tgcggcctct tccgcgtctt cgccttcgcc   4380
ctcagacgag tcggatctcc ctttgggccg cctccccgcc tggaattcga gctcggtacg   4440
atcagcctcg actgtgcctt ctagttgcca gccatctgtt gtttgcccct cccccgtgcc   4500
ttccttgacc ctggaaggtg ccactcccac tgtcctttcc taataaaatg aggaaattgc   4560
atcgcattgt ctgagtaggt gtcattctat tctggggggt ggggtggggc aggacagcaa   4620
gggggaggat tgggaagaca atagcccagc ttttgttccc tttagtgagg gttaattgcg   4680
cgcttggcgt aatcatggtc atagctgttt cctgtgtgaa attgttatcc gctaattcac   4740
tcctcaggtg caggctgcct atcagaaggt ggtggctggt gtggccaatg ccctggctca   4800
caaataccac tgagatcttt ttccctctgc caaaaattat ggggacatca tgaagcccct   4860
tgagcatctg acttctggct aataaaggaa atttattttc attgcaatag tgtgttggaa   4920
```

```
tttttgtgt ctctcactcg gaaggacata tgggagggca aatcatttaa aacatcagaa   4980
tgagtatttg gtttagagtt tggcaacata tgcccatatg ctggctgcca tgaacaaagg   5040
ttggctataa agaggtcatc agtatatgaa acagccccct gctgtccatt ccttattcca   5100
tagaaaagcc ttgacttgag gttagatttt ttttatattt tgttttgtgt tatttttttc   5160
tttaacatcc ctaaaatttt ccttacatgt tttactagcc agatttttcc tcctctcctg   5220
actactccca gtcatagctg tccctcttct cttatggaga tccctcgacc tgcagcccaa   5280
gcttggcgta atcatggtca tagctgtttc ctgtgtgaaa ttgttatccg ctcacaattc   5340
cacacaacat acgagccgga agcataaagt gtaaagcctg gggtgcctaa tgagtgagct   5400
aactcacatt aattgcgttg cgctcactgc ccgctttcca gtcgggaaac ctgtcgtgcc   5460
agcggatccg catctcaatt agtcagcaac catagtcccg cccctaactc cgcccatccc   5520
gcccctaact ccgcccagtt ccgcccattc tccgccccat ggctgactaa ttttttttat   5580
ttatgcagag gccgaggccg cctcggcctc tgagctattc cagaagtagt gaggaggctt   5640
ttttggaggc ctaggctttt gcaaaaagct aacttgttta ttgcagctta taatggttac   5700
aaataaagca atagcatcac aaatttcaca aataaagcat ttttttcact gcattctagt   5760
tgtggtttgt ccaaactcat caatgtatct tatcatgtct ggatccgctg cattaatgaa   5820
tcggccaacg cgcggggaga ggcggtttgc gtattgggcg ctcttccgct tcctcgctca   5880
ctgactcgct gcgctcggtc gttcggctgc ggcgagcggt atcagctcac tcaaaggcgg   5940
taatacggtt atccacagaa tcaggggata acgcaggaaa gaacatgtga gcaaaaggcc   6000
agcaaaaggc caggaaccgt aaaaaggccg cgttgctggc gtttttccat aggctccgcc   6060
cccctgacga gcatcacaaa aatcgacgct caagtcagag gtggcgaaac ccgacaggac   6120
tataaagata ccaggcgttt ccccctggaa gctccctcgt gcgctctcct gttccgaccc   6180
tgccgcttac cggatacctg tccgcctttc tcccttcggg aagcgtggcg ctttctcata   6240
gctcacgctg taggtatctc agttcggtgt aggtcgttcg ctccaagctg ggctgtgtgc   6300
acgaaccccc cgttcagccc gaccgctgcg ccttatccgg taactatcgt cttgagtcca   6360
acccggtaag acacgactta tcgccactgg cagcagccac tggtaacagg attagcagag   6420
cgaggtatgt aggcggtgct acagagttct tgaagtggtg gcctaactac ggctacacta   6480
gaagaacagt atttggtatc tgcgctctgc tgaagccagt taccttcgga aaaagagttg   6540
gtagctcttg atccggcaaa caaaccaccg ctggtagcgg tggttttttt gtttgcaagc   6600
agcagattac gcgcagaaaa aaaggatctc aagaagatcc tttgatcttt tctacggggt   6660
ctgacgctca gtggaacgaa aactcacgtt aagggatttt ggtcatgaga ttatcaaaaa   6720
ggatcttcac ctagatcctt ttaaattaaa aatgaagttt taaatcaatc taaagtatat   6780
atgagtaaac ttggtctgac agttaccaat gcttaatcag tgaggcacct atctcagcga   6840
tctgtctatt tcgttcatcc atagttgcct gactccccgt cgtgtagata actacgatac   6900
gggagggctt accatctggc cccagtgctg caatgatacc gcgagaccca cgctcaccgg   6960
ctccagattt atcagcaata aaccagccag ccggaagggc cgagcgcaga agtggtcctg   7020
caactttatc cgcctccatc cagtctatta attgttgccg ggaagctaga gtaagtagtt   7080
cgccagttaa tagtttgcgc aacgttgttg ccattgctac aggcatcgtg gtgtcacgct   7140
cgtcgtttgg tatggcttca ttcagctccg gttcccaacg atcaaggcga gttacatgat   7200
cccccatgtt gtgcaaaaaa gcggttagct ccttcggtcc tccgatcgtt gtcagaagta   7260
agttggccgc agtgttatca ctcatggtta tggcagcact gcataattct cttactgtca   7320
```

tgccatccgt aagatgcttt tctgtgactg gtgagtactc aaccaagtca ttctgagaat 7380
agtgtatgcg gcgaccgagt tgctcttgcc cggcgtcaat acgggataat accgcgccac 7440
atagcagaac tttaaaagtg ctcatcattg gaaaacgttc ttcggggcga aaactctcaa 7500
ggatcttacc gctgttgaga tccagttcga tgtaacccac tcgtgcaccc aactgatctt 7560
cagcatcttt tactttcacc agcgtttctg ggtgagcaaa aacaggaagg caaaatgccg 7620
caaaaaaggg aataagggcg acacggaaat gttgaatact catactcttc ctttttcaat 7680
attattgaag catttatcag ggttattgtc tcatgagcgg atacatattt gaatgtattt 7740
agaaaaataa acaaataggg gttccgcgca catttccccg aaaagtgcca cctg 7794

<210> SEQ ID NO 2

<400> SEQUENCE: 2

000

<210> SEQ ID NO 3
<211> LENGTH: 8770
<212> TYPE: DNA
<213> ORGANISM: Mouse
<220> FEATURE:
<221> NAME/KEY: misc_feature
<222> LOCATION: (511)..(511)
<223> OTHER INFORMATION: n is a, c, g, or t

<400> SEQUENCE: 3
gacattgatt attgactagt tattaatagt aatcaattac ggggtcatta gttcatagcc 60
catatatgga gttccgcgtt acataactta cggtaaatgg cccgcctggc tgaccgccca 120
acgacccccg cccattgacg tcaataatga cgtatgttcc catagtaacg ccaataggga 180
ctttccattg acgtcaatgg gtggagtatt tacggtaaac tgcccacttg gcagtacatc 240
aagtgtatca tatgccaagt acgcccccta ttgacgtcaa tgacggtaaa tggcccgcct 300
ggcattatgc ccagtacatg accttatggg actttcctac ttggcagtac atctacgtat 360
tagtcatcgc tattaccatg gtcgaggtga gccccacgtt ctgcttcact ctccccatct 420 ccccccccctc cccaccccca attttgtatt tatttatttt ttaattattt tgtgcagcga 480
tgggggcggg gggggggggg ggcgcgcgcc nggggggggc ggggcggggc gaggggcggg 540
gcggggcgag gcggagaggt gcggcggcag ccaatcagag cggcgcgctc cgaaagtttc 600
cttttatggc gaggcggcgg cggcggcggc cctataaaaa gcgaagcgcg cggcgggcgg 660
gagtcgctgc gcgctgcctt cgccccgtgc cccgctccgc cgccgcctcg cgccgcccgc 720
cccggctctg actgaccgcg ttactcccac aggtgagcgg gcgggacggc ccttctcctc 780
cgggctgtaa ttagcgcttg gtttaatgac ggcttgtttc ttttctgtgg ctgcgtgaaa 840
gccttgaggg gctccgggag ggccctttgt gcggggggag cggctcgggg ggtgcgtgcg 900
tgtgtgtgtg cgtggggagc gccgcgtgcg gctccgcgct gcccggcggc tgtgagcgct 960
gcgggcgcgg cgcggggctt tgtgcgctcc gcagtgtgcg cgaggggagc gcggccgggg 1020
gcggtgcccc gcggtgcggg gggggctgcg aggggaacaa aggctgcgtg cggggtgtgt 1080
gcgtgggggg gtgagcaggg ggtgtgggcg cgtcggtcgg gctgcaaccc cccctgcacc 1140
cccctccccg agttgctgag cacggcccgg cttcgggtgc ggggctccgt acggggcgtg 1200
gcgcggggct cgccgtgccg ggcggggggk ggcggcaggt gggggtgccg ggcggggcgg 1260
ggccgcctcg ggccggggag ggctcggggg aggggcgcgg cggcccccgg agcgccggcg 1320

```
gctgtcgagg cgcggcgagc cgcagccatt gccttttatg gtaatcgtgc gagagggcgc   1380
agggacttcc tttgtcccaa atctgtgcgg agccgaaatc tgggaggcgc cgccgcaccc   1440
cctctagcgg gcgcggggcg aagcggtgcg gcgccggcag gaaggaaatg ggcggggagg   1500
gccttcgtgc gtcgccgcgc cgccgtcccc ttctccctct ccagcctcgg ggctgtccgc   1560
gggggacgg ctgccttcgg gggggacggg gcagggcggg gttcggcttc tggcgtgtga   1620
ccggcggctc tagagcctct gctaaccatg ttcatgcctt cttctttttc ctacagctcc   1680
tgggcaacgt gctggttatt gtgctgtctc atcattttgg caaagaattc ggtaccgcgg   1740
gcccgggatc caccggtagc ggccatgcca gagccagcga agtctgctcc cgccccgaaa   1800
aagggctcca agaaggcggt gactaaggcg cagaagaaag gcggcaagaa gcgcaagcgc   1860
agccgcaagg agagctattc catctatgtg tacaaggttc tgaagcaggt ccaccctgac   1920
accggcattt cgtccaaggc catgggcatc atgaattcgt ttgtgaacga cattttcgag   1980
cgcatcgcag gtgaggcttc ccgcctggcg cattacaaca agcgctcgac catcacctcc   2040
agggagatcc agacggccgt gcgcctgctg ctgcctgggg agttggccaa gcacgccgtg   2100
tccgagggta ctaaggccat caccaagtac accagcgcta aggcggccgc tatggtgtct   2160
aagggcgaag agctgatcaa ggaaaatatg cgtatgaagg tggtcatgga aggttcggtc   2220
aacggccacc aattcaaatg cacaggtgaa ggagaaggca gaccgtacga gggagtgcaa   2280
accatgagga tcaaagtcat cgagggagga cccctgccat ttgcctttga cattcttgcc   2340
acgtcgttca tgtatggcag ccgtaccttt atcaagtacc cggccgacat ccctgatttc   2400
tttaaacagt cctttcctga gggttttact tgggaaagag ttacgagata cgaagatggt   2460
ggagtcgtca ccgtcacgca ggacaccagc cttgaggatg gcgagctcgt ctacaacgtc   2520
aaggtcagag gggtaaactt tccctccaat ggtcccgtga tgcagaagaa gaccaagggt   2580
tgggagccta atacagagat gatgtatcca gcagatggtg gtctgagagg atacactgac   2640
atcgcactga aagttgatgg tggtggccat ctgcactgca acttcgtgac aacttacagg   2700
tcaaaaaaga ccgtcgggaa catcaagatg cccggtgtcc atgccgttga tcaccgcctg   2760
gaaaggatcg aggagagtga caatgaaacc tacgtagtgc aaagagaagt ggcagttgcc   2820
aaatacagca accttggtgg tggcatggac gagctgtaca agtgaattcc tcgactagaa   2880
ttgggcccgg gatccgcccc tctccctccc ccccccctaa cgttactggc cgaagccgct   2940
tggaataagg ccggtgtgcg tttgtctata tgttattttc caccatattg ccgtcttttg   3000
gcaatgtgag ggcccggaaa cctggccctg tcttcttgac gagcattcct aggggtcttt   3060
cccctctcgc caaaggaatg caaggtctgt tgaatgtcgt gaaggaagca gttcctctgg   3120
aagcttcttg aagacaaaca acgtctgtag cgaccctttg caggcagcgg aaccccccac   3180
ctggcgacag gtgcctctgc ggccaaaagc cacgtgtata agatacacct gcaaaggcgg   3240
cacaacccca gtgccacgtt gtgagttgga tagttgtgga aagagtcaaa tggctctcct   3300
caagcgtatt caacaagggg ctgaaggatg cccagaaggt accccattgt atgggatctg   3360
atctggggcc tcggtacaca tgctttacat gtgtttagtc gaggttaaaa aaacgtctag   3420
gccccccgaa ccacggggac gtggttttcc tttgaaaaac acgatgataa tatggccaca   3480
gcttgtccac catgctcgag tccatgagca gcatcacctg tgatcccgcc atctacggcg   3540
aatggagcag ggagaaccag ttctgcgtgg agaagagcct gatcaccctg gacggcatca   3600
agtacgtcca gctggtgatg gccgtcgtga gcgcctgtca ggtgttcttc atggtgacca   3660
```

gagcccccaa ggtgccctgg gaagccatct acctgcccac caccgagatg atcacctatt 3720
ccctggcctt caccggaaac ggctacatca gagtggccaa tggcaagtac ctgccctggg 3780
ccagaatggc cagctggctg tgcacctgcc ctatcatgct gggcctggtg agcaatatgg 3840
ccctcgtgaa gtacaagagc atccccctca accctatgat gatcgccgcc tccagcatct 3900
gcaccgtgtt cggcatcacc gcctccgtgg tgctagaccc gctgcacgtg tggctgtact 3960
gtttcatcag cagcatcttc ttcatcttcg agatggtggt ggccttcgcc attttcgcca 4020
ttaccatcca cgatttccag accatcggct cccccatgtc cctgaaggtg gtggagaggc 4080
tgaagctgat gaggatcgtg ttctacgtga gctggatggc ctaccctatc ctgtggagct 4140
tctccagcac cggcgcctgc atcatgagcg agaacaccag cagcgtgctg tacctgctgg 4200
gcgacgctct gtgcaagaac acctacggca tcctgctgtg ggctacaacc tggggcctgc 4260
tgaacggcaa gtgggacagg gattacgtga agggcaggaa cgtggacggc accctgatgc 4320
ctgagtacga gcaggacctg gagaagggca acaccgagag gtacgaggac gccagagccg 4380
gcgagaccgc accggtagat tacaaagacg atgacgataa gcagtcccag cccatcctca 4440
acaccaagga gatggccccg cagagcaagc ctccagagga gctggagatg agcagcatgc 4500
ccagccccgt ggcccctctg cccgcacgca cggagggcgt catcgacatg cggagcatgt 4560
ccagcattga cagcttcatc agctgtgcca cggacttccc tgaagccacc agattcttct 4620
gctacgagaa cgaggtgtga ggcgcgccct cgaggccgca ggtaagtatc aaggttacaa 4680
gacaggttta aggagaccaa tagaaactgg gcttgtcgag acagagaaga ctcttgcgtt 4740
tctgataggc acctattggt cttactgaca tccactttgc ctttctctcc acaggtgtcg 4800
acaatcaacc tctggattac aaaatttgtg aaagattgac tggtattctt aactatgttg 4860
ctccttttac gctatgtgga tacgctgctt taatgccttt gtatcatgct attgcttccc 4920
gtatggcttt cattttctcc tccttgtata aatcctggtt gctgtctctt tatgaggagt 4980
tgtggcccgt tgtcaggcaa cgtggcgtgg tgtgcactgt gtttgctgac gcaaccccca 5040
ctggttgggg cattgccacc acctgtcagc tcctttccgg gactttcgct ttccccctcc 5100
ctattgccac ggcggaactc atcgccgcct gccttgcccg ctgctggaca ggggctcggc 5160
tgttgggcac tgacaattcc gtggtgttgt cggggaagct gacgtccttt ccatggctgc 5220
tcgcctgtgt tgccacctgg attctgcgcg ggacgtcctt ctgctacgtc ccttcggccc 5280
tcaatccagc ggaccttcct tcccgcggcc tgctgccggc tctgcggcct cttccgcgtc 5340
ttcgccttcg ccctcagacg agtcggatct ccctttgggc cgcctccccg cctggaattc 5400
gagctcggta cgatcagcct cgactgtgcc ttctagttgc cagccatctg ttgtttgccc 5460
ctcccccgtg ccttccttga ccctggaagg tgccactccc actgtccttt cctaataaaa 5520
tgaggaaatt gcatcgcatt gtctgagtag gtgtcattct attctggggg gtggggtggg 5580
gcaggacagc aagggggagg attgggaaga caatagccca gcttttgttc cctttagtga 5640
gggttaattg cgcgcttggc gtaatcatgg tcatagctgt ttcctgtgtg aaattgttat 5700
ccgctaattc actcctcagg tgcaggctgc ctatcagaag gtggtggctg gtgtggccaa 5760
tgccctggct cacaaatacc actgagatct ttttccctct gccaaaaatt atggggacat 5820
catgaagccc cttgagcatc tgacttctgg ctaataaagg aaatttattt tcattgcaat 5880
agtgtgttgg aatttttttgt gtctctcact cggaaggaca tatgggaggg caaatcattt 5940
aaaacatcag aatgagtatt tggtttagag tttggcaaca tatgcccata tgctggctgc 6000
catgaacaaa ggttggctat aaagaggtca tcagtatatg aaacagcccc ctgctgtcca 6060

```
ttccttattc catagaaaag ccttgacttg aggttagatt ttttttatat tttgttttgt   6120
gttatttttt tctttaacat ccctaaaatt ttccttacat gttttactag ccagattttt   6180
cctcctctcc tgactactcc cagtcatagc tgtccctctt ctcttatgga gatccctcga   6240
cctgcagccc aagcttggcg taatcatggt catagctgtt tcctgtgtga aattgttatc   6300
cgctcacaat tccacacaac atacgagccg gaagcataaa gtgtaaagcc tggggtgcct   6360
aatgagtgag ctaactcaca ttaattgcgt tgcgctcact gcccgctttc cagtcgggaa   6420
acctgtcgtg ccagcggatc cgcatctcaa ttagtcagca accatagtcc cgcccctaac   6480
tccgcccatc ccgcccctaa ctccgcccag ttccgcccat tctccgcccc atggctgact   6540
aatttttttt atttatgcag aggccgaggc cgcctcggcc tctgagctat tccagaagta   6600
gtgaggaggc ttttttggag gcctaggctt ttgcaaaaag ctaacttgtt tattgcagct   6660
tataatggtt acaaataaag caatagcatc acaaatttca caaataaagc atttttttca   6720
ctgcattcta gttgtggttt gtccaaactc atcaatgtat cttatcatgt ctggatccgc   6780
tgcattaatg aatcggccaa cgcgcgggga gaggcggttt gcgtattggg cgctcttccg   6840
cttcctcgct cactgactcg ctgcgctcgg tcgttcggct gcggcgagcg gtatcagctc   6900
actcaaaggc ggtaatacgg ttatccacag aatcagggga taacgcagga aagaacatgt   6960
gagcaaaagg ccagcaaaag gccaggaacc gtaaaaaggc cgcgttgctg gcgtttttcc   7020
ataggctccg cccccctgac gagcatcaca aaaatcgacg ctcaagtcag aggtggcgaa   7080
acccgacagg actataaaga taccaggcgt ttccccctgg aagctccctc gtgcgctctc   7140
ctgttccgac cctgccgctt accggatacc tgtccgcctt tctcccttcg ggaagcgtgg   7200
cgctttctca tagctcacgc tgtaggtatc tcagttcggt gtaggtcgtt cgctccaagc   7260
tgggctgtgt gcacgaaccc cccgttcagc ccgaccgctg cgccttatcc ggtaactatc   7320
gtcttgagtc caacccggta agacacgact tatcgccact ggcagcagcc actggtaaca   7380
ggattagcag agcgaggtat gtaggcggtg ctacagagtt cttgaagtgg tggcctaact   7440
acggctacac tagaagaaca gtatttggta tctgcgctct gctgaagcca gttaccttcg   7500
gaaaaagagt tggtagctct tgatccggca aacaaaccac cgctggtagc ggtggttttt   7560
ttgtttgcaa gcagcagatt acgcgcagaa aaaaaggatc tcaagaagat cctttgatct   7620
tttctacggg gtctgacgct cagtggaacg aaaactcacg ttaagggatt ttggtcatga   7680
gattatcaaa aaggatcttc acctagatcc ttttaaatta aaaatgaagt tttaaatcaa   7740
tctaaagtat atatgagtaa acttggtctg acagttacca atgcttaatc agtgaggcac   7800
ctatctcagc gatctgtcta tttcgttcat ccatagttgc ctgactcccc gtcgtgtaga   7860
taactacgat acgggagggc ttaccatctg gccccagtgc tgcaatgata ccgcgagacc   7920
cacgctcacc ggctccagat ttatcagcaa taaaccagcc agccggaagg gccgagcgca   7980
gaagtggtcc tgcaacttta tccgcctcca tccagtctat taattgttgc cgggaagcta   8040
gagtaagtag ttcgccagtt aatagtttgc gcaacgttgt tgccattgct acaggcatcg   8100
tggtgtcacg ctcgtcgttt ggtatggctt cattcagctc cggttcccaa cgatcaaggc   8160
gagttacatg atcccccatg ttgtgcaaaa aagcggttag ctccttcggt cctccgatcg   8220
ttgtcagaag taagttggcc gcagtgttat cactcatggt tatggcagca ctgcataatt   8280
ctcttactgt catgccatcc gtaagatgct tttctgtgac tggtgagtac tcaaccaagt   8340
cattctgaga atagtgtatg cggcgaccga gttgctcttg cccggcgtca atacgggata   8400
```

-continued

| | |
|---|---|
| ataccgcgcc acatagcaga actttaaaag tgctcatcat tggaaaacgt tcttcggggc | 8460 |
| gaaaactctc aaggatctta ccgctgttga gatccagttc gatgtaaccc actcgtgcac | 8520 |
| ccaactgatc ttcagcatct tttactttca ccagcgtttc tgggtgagca aaaacaggaa | 8580 |
| ggcaaaatgc cgcaaaaaag ggaataaggg cgacacggaa atgttgaata ctcatactct | 8640 |
| tcctttttca atattattga agcatttatc agggttattg tctcatgagc ggatacatat | 8700 |
| ttgaatgtat ttagaaaaat aaacaaatag gggttccgcg cacatttccc cgaaaagtgc | 8760 |
| cacctgggtc | 8770 |

THREE-DIMENSIONAL SCANLESS HOLOGRAPHIC OPTOGENETICS WITH TEMPORAL FOCUSING

CROSS-REFERENCE TO RELATED APPLICATIONS

This application claims priority to, and the benefit of, U.S. provisional patent application Ser. No. 62/620,601 filed on Jan. 23, 2018, incorporated herein by reference in its entirety.

STATEMENT REGARDING FEDERALLY SPONSORED RESEARCH OR DEVELOPMENT

This invention was made with government support under NS087725 awarded by the National Institutes of Health. The government has certain rights in the invention.

INCORPORATION-BY-REFERENCE OF SEQUENCE LISTING

This application includes a sequence listing in a text file entitled "ST-ChroME-sequence-ST25.txt" created on Jan. 23, 2019 and having a 22 kb file size. The sequence listings are submitted through EFS-Web and are incorporated herein by reference in their entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to optogenetic photostimulation, and more particularly to optical methods and tools capable of manipulating neural activity with cellular resolution and millisecond precision in three dimensions and new fast opsins. The multiphoton photoexcitation method, termed 3D-Scanless Holographic Optogenetics with Temporal focusing (3D-SHOT), and apparatus allows precise, simultaneous photo-activation of arbitrary sets of neurons anywhere within the addressable volume of the microscope. The methods open new avenues for mapping and manipulating neural circuits and allowing a real-time, cellular resolution interface to the brain.

2. Background Discussion

Future progress in neuroscience research requires the ability of tools that can activate custom neuron ensembles in vivo and across large volumes of brain tissue. The manipulation of neural circuits can be a powerful approach for revealing causal links between neural activity and behavior and the understanding neurological disorders as well as in the development of new treatments.

Early methods for functional analysis of neurons and neural networks were centered on direct stimulation of neurons by microelectrodes. Selective targeting of specific neural cells also requires precise spatial microelectrode implantation. Electrode array implants may offer good temporal and spatial resolution but are limited to small volumes within the vicinity of the electrode and are not suitable for long-term use because of poor bio-compatibility.

One approach to controlled triggering of neural activity in brain tissue is the field of optogenetics. Generally, brain cells are modified with bio-compatible engineered proteins that make ion-specific channels in the cell membrane of the neuron to become photosensitive. Photosensitive channels allow controlled external triggering of action-potentials with light by channel activation or deactivation. Direct photostimulation is possible by wide-field illumination of brain tissue; however, this simple solution activates all the photosensitive neurons simultaneously and offers limited specificity. To improve spatial resolution, computational methods have been developed to digitally focus light onto specific neurons.

Optogenetics enables rapid and reversible control of genetically-defined cell types by typically employing photosensitive microbial opsins that either generate or suppress neuronal activity in response to light. In principle, optogenetics offers high spatiotemporal precision, yet the vast majority of optogenetics studies achieve this by genetic specificity rather than spatial control due to the difficulties of accurately focusing light in brain tissue. However, since many neural computations and behaviors rely on populations of neurons that are genetically similar but spatially intermixed, new methods are needed to enable precise 3D targeting of custom neuron ensembles within the brain.

Several methods have been developed for optogenetic photostimulation, however none are capable of simultaneous single-neuron spatial resolution across a large volume without compromising temporal precision. The simplest approach, one-photon optogenetics, uses absorption in the visible spectrum to activate the opsin.

Scanning and holography are two methods for controlling the spatial distribution of light. With scanning, a diffraction-limited spot of light is placed at any desired location in space. This point-by-point method offers good spatial resolution but poor temporal resolution. Neurons receive light sequentially and the ability for simultaneous activation of multiple neurons is limited.

Holography takes advantage of coherence properties of laser light to split a light beam into several free-propagating paths that each target a different neuron. This method provides appropriate temporal resolution; however, there is generally a trade-off between operating volume size and spatial resolution.

In both cases, the main limiting factor affecting spatial resolution for photo-stimulation is optical aberration and scattering caused by in-homogeneity of brain tissue, even when using adaptive optics.

Two-photon excitation (2P) partially addresses the issue of optical scattering, dramatically improving axial resolution and depth penetration of the illumination patterns. This strategy uses a nonlinear effect to activate neurons by doubling the excitation wavelength. This improves spatial resolution and reduces the effects of optical scattering (infrared light is less scattered by brain tissue than visible wavelengths), allowing deep brain photo-stimulation with minor losses of resolution.

The most common approach employed for two-photon excitation is to focus a femtosecond-pulsed infrared laser beam into a single diffraction-limited spot which is scanned in two (2D) or three dimensions (3D). For optogenetic applications, a raster or spiral pattern is scanned across the cell body of each targeted opsin-expressing neuron. Since two-photon absorption is non-linear, photoexcitation is confined to a small spot, enabling single neuron spatial resolution at appropriate power levels. However, photosensitive opsins such as ChR2 deactivate rapidly, making it difficult to quickly achieve the photocurrent needed for fast and reliable action potential initiation by activating the opsin point by point in each neuron. While newly engineered opsins with slow deactivation kinetics may overcome this problem, they necessarily degrade temporal resolution, making it difficult to trigger action potentials with precise timing.

Accordingly, there is a need for new scanless optogenetic approaches that can target neurons at any arbitrary set of axial planes simultaneously and that are capable of manipulating neural activity with cellular resolution and millisecond precision in three dimensions.

BRIEF SUMMARY

The present technology provides digital holography systems and methods that generally use temporal focusing to replicate a spatially confined femtosecond laser pulse at any desired location within a large volume. The system devices and methods are particularly suited as tools in neuroscience research because understanding brain function requires technologies that can control the activity of large populations of neurons with high fidelity in space and time. The optogenetic methods can manipulate neural activity with cellular resolution and sub-millisecond precision in three dimensions as well as activating or suppressing the neural activity of ensembles of cortical neurons. This on-demand activation or deactivation of any selected set of neurons throughout a large volume of brain tissue opens new avenues for mapping and manipulating neural circuits, allowing a real-time, cellular resolution interface to the brain.

The technology is illustrated in the context of two-photon excitation optogenetics applications. Optogenetics requires the ability to activate custom neuron ensembles in vivo and across large volumes of brain tissue by genetically encoding neurons with photosensitive opsins that externally trigger or inhibit action potentials on demand with exposure to precisely focused light. In one preferred embodiment, 3D Scanless Holographic Optogenetics with Temporal focusing (3D-SHOT) apparatus and method allows precise, simultaneous photo-activation of arbitrary sets of neurons anywhere within the addressable volume of the microscope.

The system and methods combine computer generated holography (CGH) and temporal focusing to enable single shot in vivo photo-activation of custom neuron ensembles with single neuron spatial resolution, without limits on the addressable target planes. The strategy has the benefit of large accessible volumes of conventional holographic microscopy and takes advantage of temporal focusing to confine the two-photon photoexcitation light further in the axial dimension.

Computer Generated Holography (CGH) is a scanless technique for two-photon optogenetics, which significantly increases temporal precision of photostimulation. The CGH scheme relies on a spatial light modulator (SLM) to distribute a laser beam into multiple targets with custom 3D shapes. Unlike scanning approaches, CGH wide-area holograms matched to the dimensions of each neuron's soma should enable simultaneous, flash-based activation of large numbers of opsin molecules yielding photocurrents with fast kinetics.

Temporal Focusing (TF) eliminates the trade-off between the target size in the lateral (x,y) plane and axial (z) resolution. TF relies on a diffraction grating placed in the image plane to decompose femtosecond pulses into separate colors, such that the different wavelength components within the original pulse propagate along separate light paths. Each component of the decomposed pulse is broadened in time, which dramatically reduces peak intensity and prevents two-photon absorption until the original pulse constructively interferes at the conjugate image plane of the diffraction grating. This strategy introduces a secondary axial confinement mechanism that restricts the two-photon response to a thin layer around the focal plane. Since the thickness of this layer no longer depends on the dimensions of the targeted area, but rather on the bandwidth of the pulse, this property can be successfully applied for depth-selective two-photon fluorescence imaging and can be been implemented with mechanical scanning and with random-access volume sampling of functional fluorescence.

Although multiphoton CGH with TF can achieve wide field photostimulation with cellular resolution and high temporal precision, most implementations only enable excitation within a single 2D plane. Thus, neurons located above or below the focal plane are not addressable, a necessary condition for many experiments designed to interface with neural circuits in vivo, where neurons are located continuously in 3D.

The fundamental principle of the 3D-SHOT method is to make temporal focusing compatible with 3D CGH by placing the SLM after the diffraction grating. The 3D-SHOT methods operate by replicating identical copies of a temporally focused discs of light, termed the custom temporarily focused pattern (CTFP), at arbitrary 3D positions on a target. The dimensions of the CTFP may be selected to match the characteristic size of a layer of ⅔ cortical pyramidal neuron, for example, and may be easily adjusted for different applications. The CTFP is designed by separating a patterned laser beam (characterized by its phase and intensity) into spectral components with a diffraction grating as in a conventional TF system. The beam intensity profile determines the dimensions of the CTFP, while phase, a previously unused degree of freedom, is engineered to make 3D holography and temporal focusing compatible.

After placing a computer-generated phase pattern corresponding to a point-cloud hologram on the SLM, all spectral components are simultaneously processed to recreate identical weighted copies of the CTFP centered on each target location specified in the point cloud by all-optical convolution. Overall, this strategy makes TF compatible with 3D holography only by forgoing the ability to synthesize custom shapes, which represents an acceptable trade-off for many optogenetic applications.

For two-photon photostimulation applications, TF activates opsins over a wide area matching the neuron's shape in the focal plane, without compromising depth specificity. TF also mitigates the effects of light scattering even through thick layers of brain tissue.

The resulting neuronal activity in response to controlled point illumination of neurons in three dimensions can be detected or imaged. Fluorometric $Ca^{2+}$ imaging is one sensitive method for monitoring neuronal activity that allows simultaneous recordings of many individual cells. Volumetric 2P calcium imaging exploits the fact that most depolarizing electrical signals in nerve cells are associated with $Ca^{2+}$ influx through different types of voltage-gated $Ca^{2+}$ channels. Staining with $Ca^{2+}$ indicator dyes allows simultaneous monitoring of the activity of large numbers of individual neurons with two-photon $Ca^{2+}$ imaging. Other detection or imaging schemes may also be used.

The technology naturally expands to photostimulation and ablation surgery for other types of microscopic cells and organisms. Other applications include high speed, scanless 3D photolithography and micro-engraving where the technology can be used to improve spatial resolution, or to accelerate and simplify 3D manufacturing processes.

As an add-on system in the optical path of a commercial microscope, the technology can enable deep brain photostimulation of single neurons (enhanced spatial resolution) and deep tissue photostimulation of individual cells. Other biological and medical applications include microsurgery with targeted 3D tissue ablation. The technology can also be used as a holographic method for 3D photo lithography and 3D engraving (enhanced engraving resolution and 3D capabilities, with no mechanical parts that is cost effective and faster), or of 3D image display applications.

As used herein, the term "Cell" includes neuron cells and refers to individual cells, cell lines, primary cultures, or cultures derived from such cells unless specifically indicated. "Culture" refers to a composition including isolated cells of the same or a different type. The term "volume" refers to groups of cells, sectioned brain or nerve tissues in vitro as well as selected portions of intact brains in vivo. Excitatory or inhibitory effects in prepared cells can be elicited by expression of plasm ids or microbial genes encoding opsins and light of a characteristic wavelength.

The term "Express," "expression," and "expressing," when used with respect to gene products, indicate that the gene product of interest is expressed to a detectable level. "Significant expression" refers to expression of the gene product of interest to 10% above the minimum detectable expression. Cells with "high expression" or "high levels" of expression of a given expression product are the 10% of cells in a given sample or population of cells that exhibit the highest expression of the expression product. Cells with "low expression" of a given expression product are the 10% of cells in a given sample or population of cells that exhibit the lowest expression of the expression product (which can be no expression).

The term "opsin" refers to any suitable known or developed excitatory or inhibitory opsin that will evoke a cellular response or other activity upon exposure to light of characteristic wavelengths. The terms fast or slow refer to the comparative rate of cellular response as used in the art.

In varying embodiments, the opsin originates from the expression of a polynucleotide having at least about 60% sequence identity, e.g., at least about 65%, 70%, 75%, 80%, 85%, 90%, 91%, 92%, 93%, 94%, 95%, 96%, 97%, 98%, 99% or 100% sequence identity to SEQ ID NO: 1.

In varying embodiments, the opsin originates from the expression of a polynucleotide having at least about 60% sequence identity, e.g., at least about 65%, 70%, 75%, 80%, 85%, 90%, 91%, 92%, 93%, 94%, 95%, 96%, 97%, 98%, 99% or 100% sequence identity to SEQ ID NO: 2.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of an apparatus, system and methods for three dimensional scanless holographic optogenetics with temporal focusing allowing precise, simultaneous photo-activation of arbitrary sets of neurons anywhere within the addressable volume of a microscope to activate or silence neural ensemble activity are generally shown. Although the technology is illustrated in the context of optogenetics, the apparatus and methods can be adapted to other settings such as photolithography, microetching or precision ablation surgery.

Figure 1:
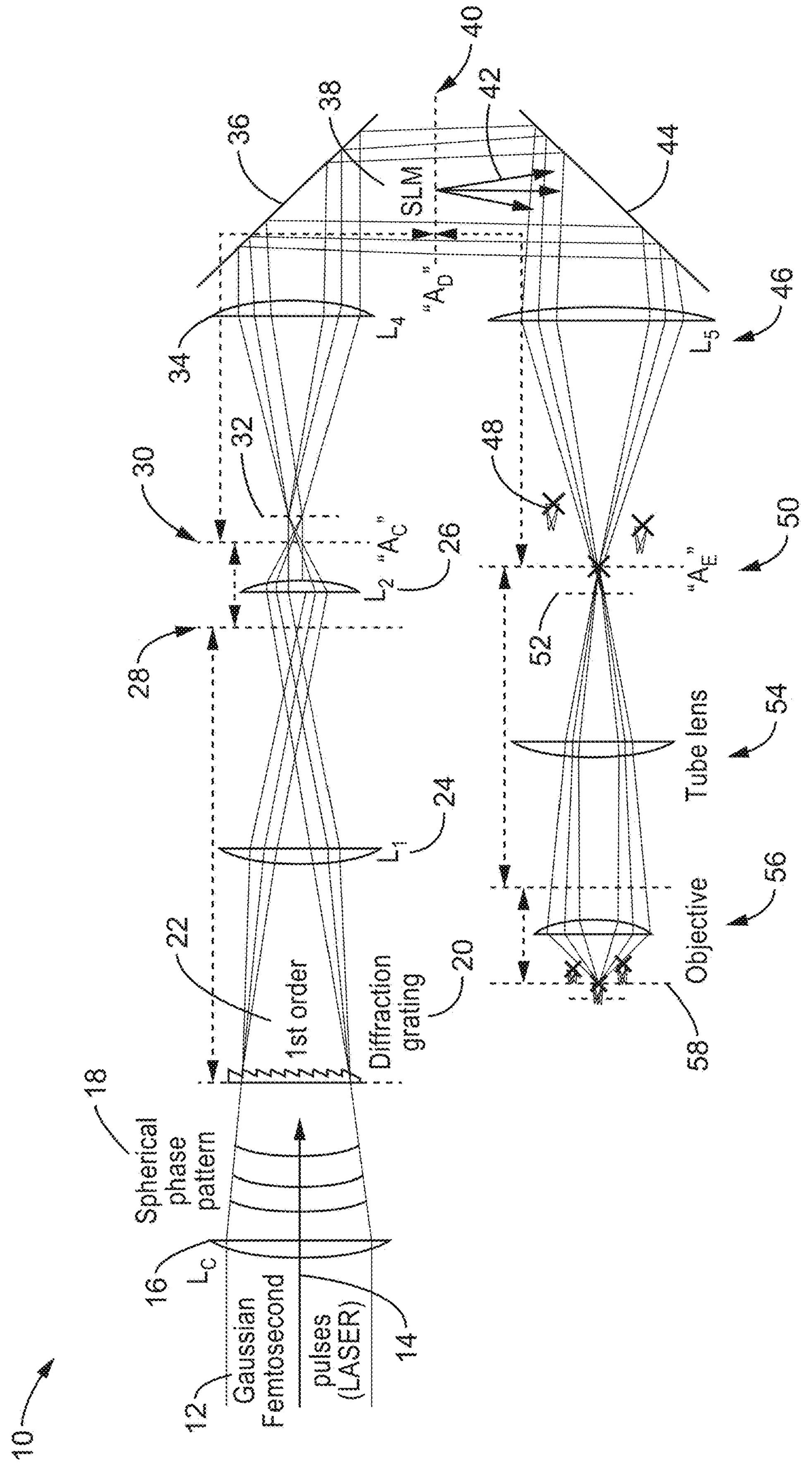
FIG. 1 is a schematic diagram of a 3D-SHOT apparatus according to one embodiment of the technology.
Figure 6:
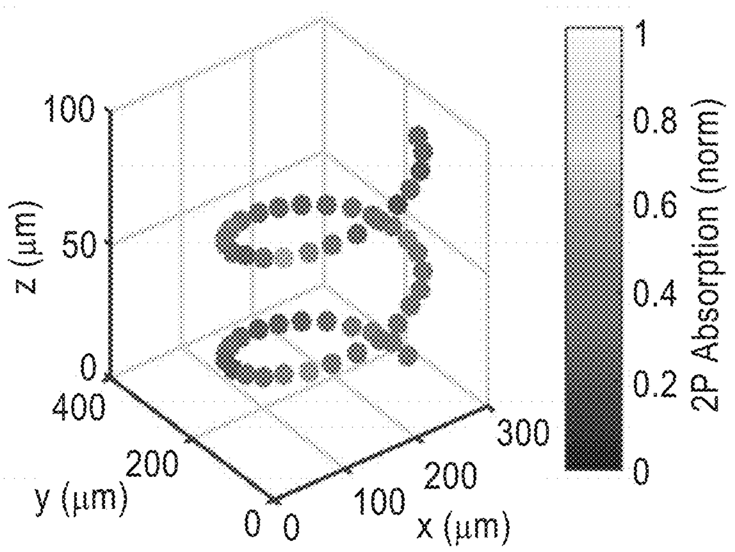
FIG. 6 is a simultaneous 3D-SHOT phase-mask corresponding to a point-cloud hologram targeting 50 spots in a spiral pattern, each occupying 50 unique positions in individual z planes.

Several embodiments of the technology are described generally in FIG. 1 to FIG. FIG. 6 to illustrate the controllable characteristics and functionality of the system apparatus and methods for spatiotemporal control over neural activity in vivo opening new avenues for mapping and manipulating neural circuits and allowing a real-time neural interface with cellular resolution.

It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Turning now to FIG. 1, one simple embodiment of a 3D-SHOT diagnostic apparatus 10 is shown schematically. An infrared laser 12 is a source of Gaussian, time-bandwidth limited femtosecond pulses 14. In the embodiment shown in FIG. 1, a spherical phase mask pattern 18 is applied to the incoming Gaussian beam 14 with lens 16 ($L_c$), directly followed by diffraction on a blazed diffraction grating 20 for temporal focusing. A spherical phase pattern 18 may be applied to the laser beam 14 using lens 16 to adjust the size, s, and the sphericity, d, of the field before frequency-specific diffraction on the blazed grating 20. The distance between lens 16 and the diffraction grating 20 may be effectively reduced to zero using a set of lenses 24, 26 in a 4-f configuration which places a virtual image of the lens directly onto the diffraction grating 20, in one embodiment.

In FIG. 1, lens 24 ($L_1$) and lens 26 ($L_2$) are preferably placed in a 4-f configuration separated by a first Fourier plane 28 and followed by focal plane 30 and pattern at secondary focus 32. A large demagnification of the beam has the advantage of allowing high average power levels (up to 18 W average power tested) without damaging the diffraction grating. After the grating 20, the direction of propagation of the first-order beam 22 is wavelength-specific, decomposing the pulse in the temporal domain. Temporal focusing and the associated nonlinear response thus only happens across a disc-shaped area at depth planes corresponding to images of the diffraction grating. This 3D intensity distribution is called a Custom Temporally Focused Pattern (CTFP).

In the first-order reflected beam 22, the diffraction grating 20 decomposes the femtosecond pulse into a series of narrow-bandwidth pulses propagating along slightly different directions. This mechanism is important for temporal focusing as pulses become stretched in time with lower peak power, which prevents an effective nonlinear response until all spectrally separated pulses interfere constructively again. The focal length of Lens 16 ($L_c$) can be adjusted so that each spectral component of the pulse spans across the short axis of the spatial light modulator (SLM) 38 in the Fourier domain (i.e. Fourier plane 40).

The beam is expanded with lens 34 and directed to the phase only spatial light modulator 38. Generally, this temporally-focused disc pattern is copied to different areas in 3D by Computer Generated Holography (CGH). To do so, the Spatial Light Modulator (SLM) 38 in Fourier space 40 generates a point-cloud hologram 42 that replicates the CTFP at each target point 48 in the volume image.

The SLM 38 replicates a custom 3D intensity distribution hologram 42 after propagation to the real space through mirror 44 the telescope lens 46 ($L_5$) and primary 50 and secondary 52 focus points. The resulting volume hologram is then demagnified with the microscope tube lens 54 and objective lens 56 before impinging on the sample to create custom 3D positioning of the temporally-focused disk, each targeted at a particular neuron of the target volume.

Figure 2:
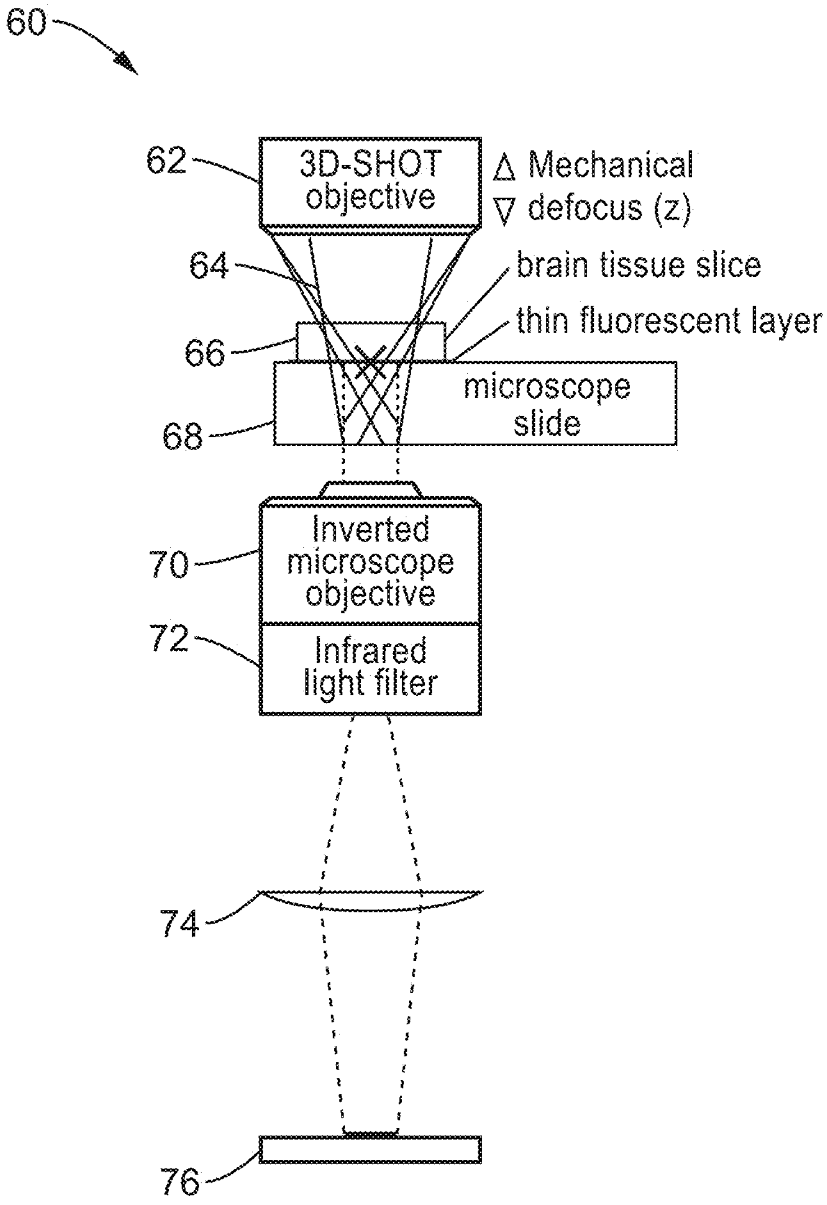
FIG. 2 is a one detection scheme with an inverted microscope and camera to observe and compare two-photon absorption patterns in 3D according to one embodiment of the technology.

Referring also to FIG. 2, the temporally focused pattern can be placed on targeted neurons with high spatial specificity and the response of the targeted neurons can be read by a variety of techniques. In FIG. 2, a fluorescent calibration slide 68 and an inverted microscope system 70 can be used to compare two-photon absorption patterns in 3D.

In this embodiment, the 3D-SHOT objective 62 is oriented to emit a photostimulation pattern 62 on a target 66 positioned on a microscope slide 66 that has a thin fluorescent layer. An inverted microscope objective 70, infrared filter 72 and lens 74 direct a 2D fluorescence image of the two-photon absorption on camera 76. Accordingly, a photostimulation pattern 64 that has been generated with CGH or 3D-SHOT can be mechanically stepped along the optical axis (z) and passed through a cell 66 expressing opsin. Photocurrents can be recorded with camera 76 in a whole-cell voltage clamp configuration.

Accordingly, volume images of two-photon induced fluorescence can be recorded by placing a calibration slide 68 coated with a thin film of fluorescent material under the 3D-SHOT microscope objective 62. The fluorescent film intersects the 3D photostimulation distribution at any desired depth "z" by adjusting the position of the microscope objective with the mechanical stage. An inverted microscope 70 with a secondary camera 76 records the two-photon induced fluorescence in 2D. By stacking 2D images while moving the objective along the "z" axis, it is possible to record direct 3D measurements of the two-photon absorption distribution.

Figure 3:
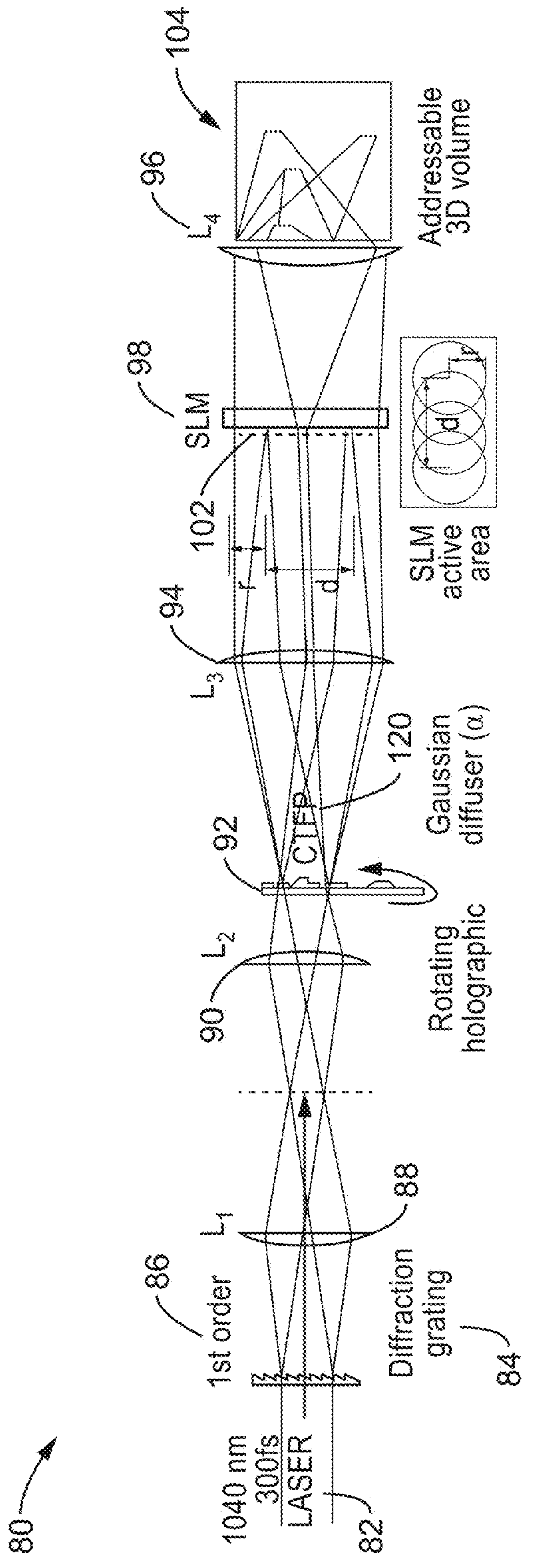
FIG. 3 is a schematic diagram of a 3D-SHOT apparatus with rotating holographic diffuser according to an alternative embodiment of the technology.

An alternative embodiment of the 3D-SHOT apparatus design is shown in FIG. 3. In the simplest implementation of 3D-SHOT shown in FIG. 1, the static phase shaping with a spherical lens was shown to create an unwanted secondary geometric focus. This secondary focus is sheared off-axis relative to the linear (x,y,z) dimensions. Although significant two-photon excitation to occur at the secondary focus is not predicted since it is not temporally focused, the secondary focus can diminish spatial resolution in 3D.

The efficacy of two-photon excitation is not only dependent on the shape of 3D-SHOT's CTFP, but also on the precise targeting of this pattern to the cell soma, the level of opsin expression in the targeted neuron, and the laser intensity. Therefore, to further enhance spatial resolution, the apparatus is modified to eliminate this secondary focus as well as any speckle noise and ensure that neurons are only photo-activated when the disc image is targeted to the cell body.

Turning now to FIG. 3, the simplified system structure 80 has laser and lens 82. A spherical phase mask is applied to a Gaussian femtosecond laser pulse incident on a blazed diffraction grating 84. The femtosecond infrared laser beam is decomposed in the spectral domain with a blazed diffraction grating 84 so that each color propagates along a different pathway and constructive interference reconstructs femtosecond pulses only at virtual images of the grating, enhancing axial confinement.

The resulting wave-field 86 is input into a 4-f system made of lenses 88 ($L_1$) and 90 ($L_2$). In the first virtual image, a rotating holographic diffuser 92 is inserted to randomize the phase of the temporally focused beam, both in space and time. The resulting Custom Temporally Focused Pattern (CTFP) 100 is then simultaneously replicated at selected 3D locations by all optical convolution with a point cloud hologram. For this, a phase-only SLM 98 is placed in Fourier space on pupil plane 102 between lens 94 ($L_3$) and lens 96 ($L_4$). The dimensions of the CTFP 100, for example, can be adjusted to yield a 10 μm photoexcitation domain after a secondary demagnification with a tube lens and the microscope objective (not shown). The laser beam diameter, pulse duration, grating frequency, focal lengths (all lenses), and the characteristic angle of the diffuser, $\alpha$, determine the spectral decomposition length, d, and the diffusion radius, r. Both dimensions can be adjusted to match the dimensions of the SLM 98 and for the desired CTFP dimensions.

Comparative measurements of two-photon absorption within a single CTFP, in 3D were shown to provide a clear resolution improvement along the z axis, eliminated secondary geometrical focus, and yielded a speckle-free 3D photoexcitation pattern matched to the characteristic dimensions of a neuron. 3D-SHOT can replicate this CTFP simultaneously at many locations for precisely targeted whole-cell photo-excitation with 50 and 200 simultaneous targets or more within the accessible range of the microscope objective.

Figure 4:
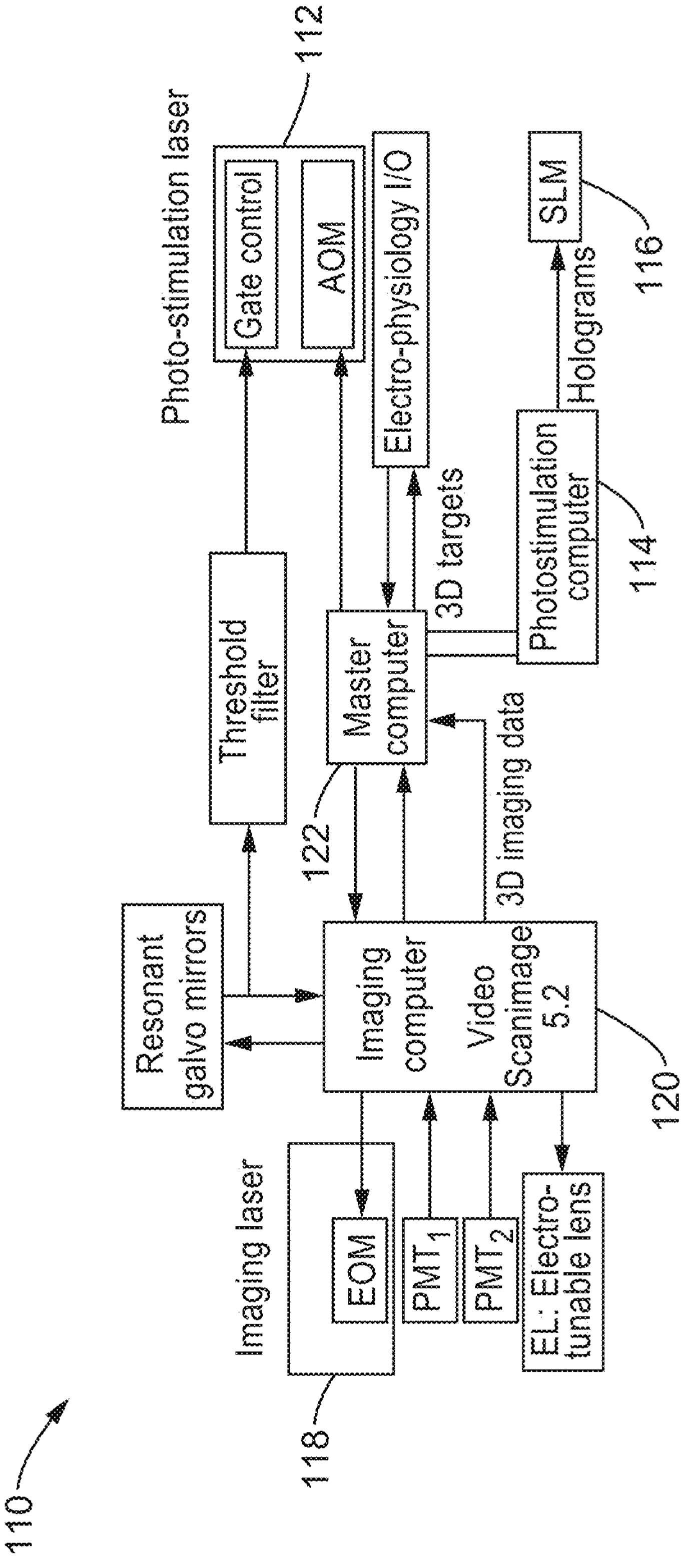
FIG. 4 is a schematic system diagram of a 3D-SHOT photoactivation and imaging system with photostimulation, image acquisition and processing and control subsystems according to another embodiment of the technology.

It will be seen that the simplified devices of FIG. 1 through FIG. 3 can be incorporated in more complex system settings that allow simultaneous 2P imaging and 3D-SHOT photostimulation as well as computer control of the systems and components. For example, in the embodiment shown in FIG. 4, the photostimulation, imaging and recording subsystems may be integrated and placed under computer control. The photostimulation subsystem with photostimulation laser 112, rotating diffuser, lens and mirror control, hologram formulation and SLM are controlled by photostimulation computer 114. The first computer 114 is dedicated to performing photostimulation, for precomputing of the holograms, and for online display of holograms on the SLM in response to a trigger pulse.

The imaging subsystem has an imaging laser 118, detector/camera, recording and lens and mirror control that is controlled by programming of an imaging computer 120. The imaging system can be independently controlled using programming of the second computer 120 and may receive a digital trigger anytime a volume image acquisition is requested. Both the photostimulation 114 and imaging 120 computers are controlled by a third (master) computer 122 that synchronizes imaging, photostimulation and display as perform well as any electro-physiology measurement, when relevant. The master computer 122 may also process, compile and store images.

The apparatus illustrated schematically in FIG. 1 to FIG. 4 can be adapted to any setting where controlled points of light in three-dimensions are essential such as 3D photo lithography, 3D engraving or targeted 3D tissue ablation in microsurgery. However, the apparatus is particularly suited for optogenetic inquiries of neural circuits and control of single neurons or ensembles of neurons. Optogenetics requires the ability to activate custom neuron ensembles in vivo and across large volumes of brain tissue by genetically encoding neurons with photosensitive opsins that externally trigger or inhibit action potentials on demand with exposure to precisely focused light.

Figure 5:
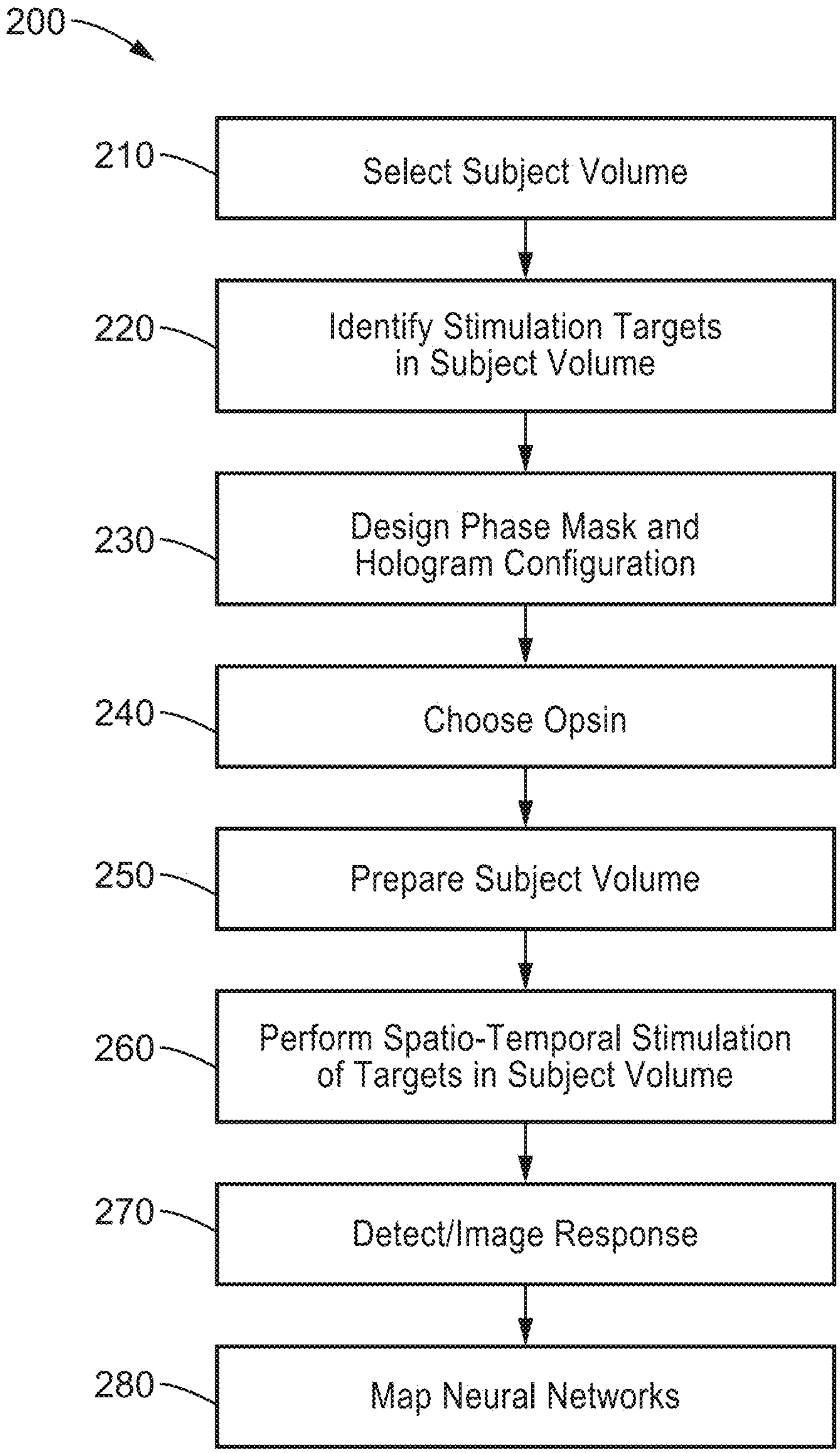
FIG. 5 is a schematic block system diagram of a method for optogenetic analysis with control the activity of genetically-defined neurons with light according to one embodiment of the technology.

Turning now to FIG. 5, one method 200 for three dimensional scanless holographic optogenetics with temporal focusing and volumetric imaging is shown schematically. The initial step, at block 210, is the selection of the subject volume for analysis with optogenetics. The subject volume may be a section of brain tissue with a population of neurons for analysis in vitro. The subject volume may also be intact brain or nerve tissues of a live animal for analysis in vivo.

Two-photon (2P) optogenetics, for example, allows experimenters to stimulate neurons based on their precise spatial location as well as their genetic identity. Combined with 2P calcium imaging, this procedure allows activation of specific neurons based on any desired feature. The subject volume may be selected at block 210 to identify neural circuits that encode information in the rate, timing, number, and synchrony of action potentials, as well as in the identity of active neurons. Similarly, deleting action potentials from functionally defined neurons will allow experimenters to probe the elements of endogenous activity patterns that contribute to neural computations and behaviors with unprecedented precision.

Once the nature of the analysis is determined and subject volume is selected at block 210, the structure of the subject volume is generally considered and the stimulation targets within the subject volume are identified at block 220.

For example, single neurons or groups of neurons can be targeted in three-dimensional space within the subject volume. Neurons may be targeted to see resulting activity from spikes originating from specific, functionally defined neurons. Likewise, neurons may be targeted to detect silencing of neural activity from suppression of identified neurons in vivo. Systematically varying spike rate, timing, synchrony, and number of targeted neurons would also permit definitive tests of how neural ensembles encode information.

Targets at block 220 may also be selected at random within the subject volume to evaluate a broader response. Target locations may also be selected geometrically to designated locations in a grid or spiral pattern such as shown in FIG. 6.

The designation of desired targets at specific locations within the bulk of the subject volume provide design parameters for the computed hologram design and phase mask design at block 230 of FIG. 5. This embodiment of the method uses point-cloud holography to place multiple copies of a temporally focused disc matching the dimensions of a neuron's cell body anywhere within the operating volume of the microscope. Experiments in cultured cells, brain slices, and in living mice demonstrated single-neuron spatial resolution even when optically targeting randomly distributed groups of neurons in 3D.

As described previously, the apparatus replicates identical copies of a temporally focused disc of light, termed the custom temporarily focused pattern (CTFP), at arbitrary 3D positions in the subject volume. In one embodiment, for example, the hologram is calculated targeting 50 spots in a spiral pattern and occupying 50 individual z-planes can be produced as shown in FIG. 6.

The dimensions of the CTFP are chosen, at block 230, to match the characteristic size of a neuron and may be easily adjusted for different applications. The CTFP is designed by separating a patterned laser beam (characterized by its phase and intensity) into spectral components with a diffraction grating. The beam intensity profile determines the dimensions of the CTFP, while the phase is engineered to make 3D holography and temporal focusing compatible.

The spherical phase mask is typically imposed by a lens. However, alternate phase masks (for instance generated with a secondary SLM), could also be employed as long as they expand the spectral components to cover enough area of the SLM to enable holography.

At the step of block 240 of FIG. 5, a suitable opsin is selected for the apparatus configuration, cell type and optogenetic procedure that are selected. Many different opsin variants have been discovered or engineered for optogenetics. It is now possible to stimulate or inhibit neuronal activity or intracellular signaling pathways on fast or slow timescales with a variety of different wavelengths of light.

Known opsins and variants such as ST-C1V1 T/T, ST-CsChR, ST-ChrimsonR, ST-ChR2, ST-CheTA, Chronos, ST-Chronos, ST-Chronos$_{M140T}$, ST-CoChR, ST-Chronos$_{F243Y}$, STChroME, ST-ChroME$_{S273A}$ may be suitable for photostimulation.

However, many existing excitatory opsins are too weak or too slow to drive precise neural activity patterns with scanless 2P optogenetics in vivo. Particularly preferred is a newly engineered opsin variant optimized for multiphoton optogenetics called ChroME (SEQ ID. NO. 1). ChroME, is an ultrafast and highly potent opsin with 3 to 5 times larger photocurrents than opsins commonly used for multiphoton optogenetics. This allows high-fidelity sub-millisecond control of pyramidal neuron spiking.

Furthermore, to achieve all-optical suppression, an inhibitory anion opsin, GtACR1 (e.g. ST-eGtACR1, IRES-STeGtACR1, or ST-GtACR1), which exhibits 80-fold increases in photocurrent over previously employed pump-based opsins for multiphoton optogenetic silencing is particularly preferred. Although GtACR1 (SEQ ID. NO. 2) is particularly preferred, other inhibitory opsins can be used.

The newly developed opsins are particularly useful with the 3D-SHOT apparatus, but they can also be used with other optogenetic approaches requiring speedy opsins.

Neurons or cells genetically encoded with photosensitive opsins that externally trigger or inhibit action potentials on demand with light are prepared at block 250 of FIG. 1. The subject test volume is genetically engineered using a variety of mechanisms, at block 250 to express one or more light-sensitive opsin genes, plasmids or proteins. Procedures for engineering neurons or cells to express opsins are well developed and routine in the art.

One popular method for engineering cells is the use of viral vector targeting systems because they allow tight control over spatial localization. In this approach, an engineered virus vector containing an opsin gene and promotor is injected into the brain or tissue of interest. Another method is the formation of stable transgenic or knock-in animals that express an opsin in a particular neural population. A further suitable method is electroporation. Other methods exist and are suitable for preparing the subject volume at block 250.

Depending on the particular kind of opsin that was chosen for expression at block 240, the engineered neurons will be transiently activated or inhibited or their signaling pathways will be modulated after illumination with light of the correct frequency at block 260. The 3D-SHOT apparatus shown in FIG. 1 or FIG. 3 can simultaneously activate or inhibit custom ensembles of neurons in 3D, with high spatial and temporal resolution at speeds only limited by the frame rate of the SLM.

The resulting neuronal activity in response to controlled point illumination of neurons in three dimensions can be imaged or detected at block 270. In one embodiment, the illumination scheme is combined with volumetric 2P calcium imaging to identify the response to photostimulation. Fluorometric $Ca^{2+}$ imaging is one sensitive method for monitoring neuronal activity that allows simultaneous recordings of many individual cells. However, other detection methods known in the art are well developed and can also be used at block 270 to evaluate the results of the specific photostimulation at block 260.

Optionally, stimulation or inhibition responses of brain or nerve networks can be mapped at block 280. The system and methods provide tools to create or edit custom patterns of spatiotemporal neural activity that is key to understanding the logic and syntax of the neural codes.

The technology described herein may be better understood with reference to the accompanying examples, which are intended for purposes of illustration only and should not be construed as in any sense limiting the scope of the technology described herein as defined in the claims appended hereto.

Example 1

To evaluate the capabilities of 3D-SHOT and to quantify how two-photon absorption is spatially distributed in 3D, an apparatus was assembled as generally shown in FIG. 1.

CGH and 3D-SHOT characterization tests were performed by recording two-photon induced fluorescence on a calibration slide with an inverted microscope. A Basler ACa2500 camera, and a Leitz 6.3× Objective were used to map the entire operational range of the SLM on the camera sensor. Two infrared filters were placed along the light-path to eliminate the remaining laser light, leaving only the fluorescence signal in the visible range to be recorded by the camera sensor.

For power characterizations, thick auto-fluorescent plastic slides (Chroma) were used to simultaneously collect fluorescence light within the entire volume of excitation from a single focused image. For more precise 3D characterization of two photon absorption, a custom-made thin film of fluorescent paint (Tamiya Color TS-36 fluorescent red) sprayed on a microscope glass slide was used. Here, by mechanically displacing the image acquisition setup and the photo-excitation pattern (either from CGH or 3D-SHOT two-photon absorption in 3D was recorded by digitally assembling slice images captured at various depth levels (with micro-metric mechanical increments).

The tested apparatus used an infrared laser was used as a source of Gaussian, time-bandwidth limited, femtosecond pulses. A spherical phase mask was applied to the incoming Gaussian beam with a lens, directly followed by diffraction on a blazed diffraction grating for temporal focusing. In the first-order reflected beam, the diffraction grating decomposed the femtosecond pulse into a series of narrow-bandwidth pulses propagating along slightly different directions.

This principle is an important mechanism for temporal focusing as pulses become stretched in time with lower peak power, which prevents an effective nonlinear response until all spectrally separated pulses interfere constructively again. Femtosecond pulse reconstruction happens several times along the light path at depth levels corresponding to virtual images of the diffraction grating.

The fundamental principle of the 3D-SHOT method was an all-optical convolution product given by:

$$A_E(x, y, z, \Delta k) = A_C\left(\frac{f_4 x}{f_5}, \frac{f_4 y}{f_5}, \Delta k\right) \otimes \left[F[e^{i\varphi}]\left(\frac{x}{\lambda f_5}, \frac{y}{\lambda f_5}\right) \otimes h(x, y, z)\right],$$

where $\otimes$ denotes the convolution product. The CTFP: $A_C(x,y,\Delta k)$, adjusted to the characteristic dimensions of a neuron after demagnification, was placed at the desired locations by all-optical convolution with a computer-generated hologram corresponding to the phase mask, $\varphi$, on the SLM.

To simultaneously place copies of the CTFP at n neurons located in positions $(x_i, y_i, z_i)$ in space, an optimized hologram was computed so that the simple Fresnel propagation, h, of $F[e^{i\varphi}]$ best approximates a point cloud at the desired locations with the desired weighted intensities. By all-optical convolution, a demagnified copy of the CTFP was then recreated at each point of the cloud in the resulting field.

In one test, z-stack images were recorded by moving the excitation objective along the z-axis by 1 µm increments. The resulting data corresponded to a quantitative 3D measurement of two-photon absorption induced by the CTFP. In the specific case of a flat phase pattern on the SLM, an analytical expression was derived for the instantaneous two-photon absorption, $|A_F(x, y, z, \Delta t)|^4$, which was then used to predict and visualize the CTFP in space and time, and to compare simulation and experiments.

The results of the 3D-SHOT methods were then compared to conventional 3D holography. Using CGH, a 10 µm disk image target at z=0 was computed where a high frequency speckle pattern was imposed to maximize spatial confinement along the z-axis. Projection views of two-photon absorption along the y, x, and z axes show how even in an optimized hologram, unwanted photostimulation remains above and below a neuron targeted with the CGH method. When the 10 µm CGH pattern was replaced by a 3D-SHOT CTFP of equal size, experimental results and simulations demonstrated that temporal focusing significantly enhances spatial confinement along the z-axis.

To further demonstrate the capabilities of the 3D-SHOT methods to simultaneously illuminate many regions of interest located throughout a volume, each at a different axial z-depth, a phase-mask was computed corresponding to a point-cloud hologram with 50 targets placed in a spiral pattern, each with a unique z-position as shown in FIG. 6. The two-photon absorption in the vicinity of each targeted spot and in 3D was measured with the sub-stage camera demonstrating that 3D-SHOT can illuminate this complex set of 50 targets at 50 separate axial depths.

To identify the influence of spatial location and target number on spatial resolution independently of the predominant effect of scattering, we conducted additional experiments without scattering tissue. Increasing the number of spots did not significantly degrade the axial resolution until 750 spots were simultaneously illuminated.

Example 2

The 3D-SHOT apparatus and methods were also evaluated for use in neurobiological applications. The apparatus was configured with a pair of mirrors on a sliding stage to rapidly swap between conventional holography (CGH) and 3D-SHOT. The two optical paths were aligned so that the centers of the CTFP (3D-SHOT path) and the disc illumination (CGH path) were co-aligned along all 3 dimensions. This allowed both methods to be tested on individual cells without any digital realignment of the holograms.

The spatial resolution of the 3D-SHOT method was evaluated with quantitative measurements of the photocurrent amplitudes elicited by optogenetic stimulation in living cells. Microbial opsin proteins were expressed in either Chinese Hamster Ovary (CHO) cells in culture by transfection, or through in utero electroporation of mice embryos or viral transduction of neonatal mice to obtain expression in neurons in acutely prepared cortical brain slices or in vivo.

To measure the spatial resolution of optogenetic excitation, opsin-expressing CHO cells or brain slices were placed under the microscope objective and whole cell recordings were made to record light-evoked transmembrane currents or action potentials. The spatial resolution (or physiological point spread function PPSF) was evaluated by recording the neuronal response to multiphoton photostimulation as a function of the displacement between the holographic target and the patched cell.

The efficacy of two-photon excitation is not only dependent on the shape of 3D-SHOT's CTFP, but also on the precise targeting of this pattern to the cell soma, the level of opsin expression in the targeted neuron, and the laser intensity. Although computer generated holography offers micron-level spatial resolution for placing holographic targets onto the desired neurons with a microscope objective, the level of opsin expression varies from neuron to neuron, and consequently so does the required power level for photostimulation. Therefore, the spatial confinement of 3D-SHOT and CGH photo-excitation procedures were compared as a function of incident laser power density.

With conventional holography, substantial photocurrents located 25-50 μm above and below the disk image target were observed, indicating that photo-activation of non-targeted neurons is likely to be an issue. As predicted by simulations, temporal pulse stretching significantly enhanced spatial resolution with 3D-SHOT, as photocurrents were more significantly attenuated above and below the primary focus. As expected, the PPSF measured in neurons was broader than that of CHO cells with both CGH and 3D-SHOT, most likely due to their complex 3D morphology. In neurons and CHO cells, axial resolution with 3D-SHOT was significantly improved relative to CGH, even using several orders of magnitude more laser power. Whereas two-photon photo-excitation with CGH relies only on defocusing to confine the excitation light to the desired volume, 3D-SHOT benefits from simultaneous defocusing and temporal confinement, as femtosecond pulses are temporally dispersed above and below the desired target which further attenuates the nonlinear response regardless of the targeted area in the (x,y) plane.

The shallow relationship between laser power and spatial resolution of 3D-SHOT allows sufficient excitation light to generate action potentials without significant loss of spatial confinement, as normally occurs with CGH, and gives the user the option to use additional power to reliably stimulate neurons when the exact level of opsin expression is unknown without significantly affecting spatial resolution.

The physiological spatial resolution of CGH and 3D-SHOT in neurons was quantified by measuring the spiking probability along the radial direction in the imaging (x,y) plane and along the optical (z) axis. Holography and 3D-SHOT were compared by projecting a single photostimulation target placed at a distance (x,y,z) from a patched neuron in mouse brain slice, either with single copy of the CTFP with 3D-SHOT or a disk-shaped pattern of equivalent size using CGH. Spike probability was measured as the hologram was displaced in small increments by mechanically moving the objective relative to the patched cell.

However, with conventional holography, the spike probability along the z-axis does not permit single-cell resolution (FWHM=78±6 μm). In contrast, 3D-SHOT provides far superior resolution (FWHM=28±0.7 μm, p=0.006, Mann-Whitney compatible with single-cell resolution in all three dimensions, in that the FWHM of spike probability was on par with the typical dimensions of a cortical neuron and their inter-somatic spacing.

To demonstrate that 3D-SHOT can achieve single neuron spatial resolution under in vivo conditions, the physiological point spread function for L2/3 pyramidal neurons was quantified using either 3D-SHOT or CGH in living mice. Two-photon guided loose patch recordings were obtained from opsin-expressing neurons in anesthetized mice, generated action potentials in targeted neurons with light pulses, and measured the PPSF for CGH or 3D-SHOT excitation by digitally displacing the holographic target along the radial or axial dimension. As in brain slices, CGH and 3D-SHOT exhibited similar spatial resolution in the radial (x,y) dimensions (Radial FWHM: CGH: 15±4 μm, 3D-SHOT: 11±2 μm, p=0.46, Mann-Whitney U-Test). However, along the axial (z) dimension, 3D-SHOT excitation was significantly more spatially restricted than CGH (Axial FWHM: CGH: 70±16 μm, 3D-SHOT: 29±3 μm, p=0.004, Mann-Whitney U-Test).

To further confirm 3D-SHOT capabilities for single-cell resolution in 3D, the particularly challenging scenario of activating two vertically stacked neurons without activating a neuron located in between them was considered. This represents a much stronger test case than simply comparing the ability to separate neurons laterally. To test this scenario, holograms were computed that simultaneously targeted two axially aligned targets vertically separated by ~80 μm along the optical (z) axis, either two disc patterns with conventional 3D CGH or two copies of the CTFP target made with 3D-SHOT and a two-point hologram. The photo-induced response in a single patched cell (both CHO cells and neurons) were then compared.

As in the previous illustration, a CHO cell or neuron was patched to record photocurrent and/or spike probability as a function of the respective displacement between the cell and the photostimulation pattern with two targets on the optical axis. With conventional holography and two disk targets, a significant amount of photocurrent was observed when the cell is located between the two targets where no photocurrent is desired. Conversely, with 3D-SHOT and two similarly axially separated copies of the CTFP, no photocurrent was observed at the intermediate location, and thus spatial resolution was significantly improved. In neurons, the added non-linearity introduced by the cell's action potential threshold further enhanced the axial contrast in terms of spike probability.

One significant advantage of the 3D-SHOT system over existing approaches is its ability to simultaneously illuminate many regions of interest located throughout a volume, each at a different axial (z) depth. To demonstrate the ability of 3D-SHOT to simultaneously target disc images to unique z-planes, a phase-mask was computed corresponding to a point-cloud hologram with targets placed in a spiral pattern, each with a unique z-position. The two-photon absorption near each targeted spot and in 3D was measured with a sub-stage camera by stacking images of two-photon induced fluorescence acquired through several depth levels, with a thin fluorescent film on a calibration slide. This demonstrated that the apparatus and methods are capable of successfully illuminating this complex set of multiple targets at separate axial depths.

Example 3

To further demonstrate the functionality of the apparatus and optical methods, new opsins were engineered to be optimized for multiphoton optogenetics using scanless approaches. Existing excitatory opsins have been shown to be too weak or too slow to drive precise neural activity patterns with scanless 2P optogenetics in vivo. To allow control of neural activity with sub-millisecond precision, an opsin and a 2P stimulation approach capable of generating large currents with rapid kinetics was sought. Several conventional opsins were evaluated. However, photocurrents were insufficient to reliably spike pyramidal neurons. Since none of the conventional opsins could reliably spike neurons in response to brief holographic stimulation, a stronger opsin was engineered with the goal of holographically stimulating large ensembles of neurons.

Mutations of the ST-Chronos opsin were performed with the aim of developing a variant that would preserve its fast kinetics but would generate sufficiently large photocurrents with brief light pulses. Guided by homology modeling to the crystal structure of C1C2, a neutral putative pore residue (M140) in the pore region of ST-Chronos that is negatively charged in other opsins was identified. Mutation of this methionine to a negatively charged residue could increase the flux of positive ions through the pore and therefore increase current amplitudes.

Several mutations were tested via one-photon stimulation in Chinese hamster ovary (CHO) cells against a panel of ST-opsins and several mutants with larger photocurrent amplitudes than other opsins were identified. One of these mutants, ST-Chronos-M140E, or 'ChroME' (SEQ. ID. NO. 1), exhibited rapid decay kinetics while exhibiting photocurrents more than 10 times larger than those of the ChR2 opsin. Neurons electroporated with ST-ChroME exhibited photocurrent amplitudes 3 to 5 times larger than ST-C1V1T/T or ST-Chronos in response to CGH stimulation (5 ms at 0.4 mW/μ m2 evoked 1.8±0.2 nA). ST-ChroME retained the excitation spectrum and rapid rise time of ST-Chronos, but its decay time constant (3.0±0.4 ms) was slightly slower than ST-Chronos (1.7±0.6 ms).

In contrast to other ST-opsins, 96% of ST-ChroME neurons were activated by CGH stimulation, requiring lower laser powers and shorter light pulses to evoke spikes than the other opsins. This was true whether opsins were delivered via in utero electroporation or by viral infection.

The temporal precision of action potentials evoked from ST-ChroME+ neurons and the minority of neurons expressing other ST-opsins that could be activated were also examined. At 1 Hz, light evoked spikes from neurons expressing ST-ChroME or ST-Chronos occurred with short latency and low jitter, whereas the timing of spikes from ST-C1V1T/T or ST-ChrimsonR+ neurons was more variable. To test temporal precision while eliciting naturalistic sequences of action potentials, neurons were stimulated with Poisson trains of holographic light pulses. Neurons expressing ST-ChroME and ST-Chronos followed these patterns with high fidelity, exhibiting high spike probability and low jitter across a wide range of stimulation frequencies throughout the stimulus train (fidelity index score: ST-ChroME, 0.87±0.03; ST-Chronos, 0.90±0.02; see Methods). However, neurons expressing ST-ChrimsonR or ST-C1V1T/T could not follow complex stimulus patterns (fidelity index score: ST-ChrimsonR, 0.48±0.05; ST-C1V1T/T, 0.25±0.04).

Since ST-ChroME allowed fast, reliable responses with brief stimulation, high-speed SLMs can be employed to spike different sets of neurons at high rates. To test the speed at which spike patterns could be generated in two different neurons, two ChroME+ neurons were recorded using a fast SLM to interleave holographic stimulation of each cell at the maximum SLM rate. A Poisson train of light pulses were produced on each trial and delivered the same sequence to both neurons, separated by 3 ms. This showed that naturalistic spike trains could be generated in multiple neurons offset by brief periods using the modified opsin.

Example 4

To test whether ST-ChroME drives reliable spiking under more relevant in vivo conditions, 2P guided loose-patch recordings in anesthetized animals were acquired. While only 31% of ST-Chronos+ could be made to spike with 5-ms CGH pulses, over 89% of ST-ChroME+ neurons could be activated in vivo. Together, these data demonstrated that ST-ChroME can reliably generate the rapid, large photocurrents necessary to drive the temporally precise, short-latency spikes needed to replicate naturalistic neural activity patterns.

In vivo, ensembles of neurons expressing ST-ChroME were activated using 3D scanless holographic optogenetics with temporal focusing (3D-SHOT), synthesizing precise sequences of neural activity with cellular resolution and millisecond precision. By combining 3D-SHOT with volumetric 2P calcium imaging, all-optical control of distributed neural ensembles was obtained by simultaneously stimulating up to 50 neurons with high temporal precision and cellular resolution. The majority of ST-ChroME+ neurons fired reliable, temporally precise action potentials in response to brief 3D-SHOT stimulation using powers less than 0.2 mW/μ $m^2$. This was true when electroporated with ST-ChroME-mRuby2 or virally transduced with AAV DIO-ST-ChroME-P2A-H2B-mRuby3.

The neurons were then stimulated with naturalistic Poisson patterns, varying the pattern on each trial to generate unique sequences of evoked activity. Quantifying these experiments revealed that ST-ChroME+ neurons reliably spiked with sub-millisecond jitter, allowing the production of spatiotemporal activity patterns with high fidelity.

All-optical spatiotemporal control of neural ensembles was demonstrated using ST-ChroME to manipulate larger ensembles of cells. When testing spatial resolution of ensemble stimulation in brain slices, it was observed that the use of the ST-opsin, which increases stimulation resolution for one target, was essential when stimulating groups of neurons with many holograms, something not employed in previous manipulations of neural ensembles.

Multispot spatial resolution was tested in vivo with cell-attached recordings of ST-ChroME+ cells. The spiking PPSF was measured for each cell with holograms targeting 1-50 spots simultaneously throughout a large volume (400×400×200 μm). These tests showed that 3D-SHOT stimulation in vivo remained spatially precise when targeting up to 50 locations simultaneously.

To manipulate large groups of cells all-optically, mice were prepared and selected 150 ST-ChroME+ neurons were selected across three planes. The neurons were randomly assigned to unique neural ensembles containing overlapping sets of 10, 25, or 50 neurons and stimulated them with 10 pulses each at 10, 20, or 30 Hz. More than 50 neurons were not stimulated simultaneously due to limitations in available laser power (4.1 Watts available from the objective, resulting in approximately 0.13 mW/μ m2 or 40 mW per target, accounting for losses from the imaging gate, but not for decreased diffraction efficiency of phase masks encoding 50 spots across the accessible volume).

Neurons responded reliably to stimulation when targeted as a member of an ensemble, regardless of the identity of the other ensemble members. These neurons retained normal calcium dynamics when not being stimulated. Stimulation of ensembles was selective and successful when targeting ensembles of different sizes, at different frequencies, and either within or across axial planes.

Analysis of targeted neurons during interleaved control trials showed no evidence that repeated stimulation caused toxicity. However, continuous stimulation resulted in substantial brain heating after 1 min (6-8° C.). These data define bounds for potentially acceptable levels of laser illumination.

The ability to control the firing patterns of arbitrary neural ensembles raises the possibility of achieving optogenetic control over population activity. Since sensory stimuli often decorrelate population activity, we tested whether holographic ensemble stimulation could drive a change in population activity that mimicked a sensory stimulus. Pairwise correlations during spontaneous activity of all neurons during control trials or during trials in which random ensembles were photostimulated were computed. Ensemble photostimulation resulted in striking changes in the structure of population correlations and resulted in significant decorrelation of untargeted neurons during stimulation trials.

Conversely, targeted neurons exhibited the opposite effect, increasing their pairwise correlations on trials in which they were stimulated. These results show that high-fidelity, temporally precise holographic activation of neural ensembles can provide the scale of experimental control need to directly manipulate previously inaccessible properties of neural networks such as correlational structure and shared variability with cellular resolution.

Control over cortical inhibitory neurons was also evaluated. Whereas L2/3 neurons typically fire sparsely, cortical inhibitory neurons are heterogeneous and many fire at much higher frequencies. The spatial and genetic selectivity was combined by stimulating specific subsets of GABAergic neurons (PV, SOM, or VIP) expressing Cre recombinase transgenically and infected with AAV-DIO-ST-Chronos-mRuby2.

Inhibitory neurons are typically more excitable than pyramidal neurons, and ST-Chronos was sufficient to generate reliable action potentials in these cells. We identified power levels needed to elicit reliable spiking at 1 Hz (<0.3 mW/μ m2) were identified and Poisson 3D-SHOT stimulation was performed. Stimulation of each GABAergic cell type drove reliable, short-latency spikes with sub-millisecond jitter across many stimulation frequencies, allowing these neurons to follow stimulus trains with high fidelity. Unlike L2/3 pyramidal neurons and VIP neurons, PV and SOM cells were able to follow stimuli with instantaneous frequencies up to 100 Hz. Additionally, we replayed several unique patterns of action potentials with identical mean rates, demonstrating the ability to reliably generate precise activity patterns over many trials.

Example 5

To further demonstrate the control over spatiotemporal patterns of neural activity provided by the apparatus and methods, single neuron suppression using 3D-SHOT was performed. Initially, an optogenetic silencer to suppress neural activity with high efficacy and temporal precision was engineered. A suite of ST-inhibitory opsins with ER export motifs ('e') including pumps (eNpHR3 and eArch3) and anion channels (GtACR1, psuACR, and iC++) were synthesized and tested.

The ST-eGtACR1 opsin (SEQ ID NO. 2) generated the largest outward photocurrents while retaining moderately fast kinetics (rise time, 1.5±0.7 ms; decay time, 12.5±0.7 ms). The GtACR1 photocurrents were near saturation in normal conditions and not improved by the 'e' signal. Furthermore, the ST-eGtACR1 was more sensitive to 1,040-nm light than to 930-nm light.

Since these silencers function through different biophysical mechanisms, it was possible that the opsin with the largest photocurrent might not be the most effective suppressor of endogenous neural activity. Therefore, 2P holographic suppression in vivo was tested by performing targeted loose-patch recordings from cells expressing inhibitory opsins. Of the opsins that were tested, ST-eGtACR1 was the most efficient silencer, reducing activity to 8.4±3% of normal firing rate with 0.2 mW/μ m2 of 2P stimulation.

In contrast, at the same laser power, ST-eArch3 only reduced activity to 37±8%, whereas ST-ePsuACR or light alone did not significantly alter firing rates (82±11% and 90±9%, P=0.31 and P=0.47, respectively, Wilcoxon signed-rank test vs. no change).

To measure the timing of suppression, spiking was induced in brain slices through current injection in cells electroporated with IRES-ST-eGtACR1. The onset time of holographic suppression was varied so that spike timing was randomized trial-to-trial, and the stimulation intensity and duration were varied in separate tests. It was observed that the onset of suppression was rapid, with spiking eliminated within 1.5±0.3 ms after light onset. Like photocurrent response onsets, the onset time of suppression was power-dependent. Despite current injection, cells hyperpolarized to near the reversal potential of GtACR1 when stimulated with <0.1 mW/μ m2, indicating potent suppression (−54±3 mV at 0.08 mW/μ m2 stimulation).

Although the onset of suppression was rapid, suppression of neural activity persisted for 50-250 ms after the cessation of photostimulation, due to the decay kinetics of the GtACR1 channel. This suppression was dependent on both the intensity and duration of the light stimulus. Together, these data validated IRES-STeGtACR1 as a tool for stable, rapid suppression of neural activity using 2P optogenetics.

Example 6

The all-optical suppression of neurons and the control over spatiotemporal patterns of neural activity in vivo with the apparatus and methods was also illustrated. To achieve all-optical suppression, the potent inhibitory anion opsin, GtACR1, as described in Example 5 was used. This opsin exhibits an 80-fold increase in photocurrent over previously employed pump-based opsins for multiphoton optogenetic silencing. Using this new construct (IRES-STeGtACR1) with 3D-SHOT, precise multimodal control of neural ensemble activity with high fidelity in vivo was demonstrated.

All-optical suppression of activity in awake mice was imaged. As L2/3 pyramidal neurons fire sparsely, the methods focused on PV+ interneurons, which have high tonic firing rates. A Cre-dependent viral version of IRES-ST-eGtACR1 (AAV9 DIO-NLS-mRuby3-IRES-ST-eGtACR1) was created, and its efficacy in vitro was confirmed via whole cell recordings and in PV cells in vivo via cell-attached recordings. PV-Cre mice were co-infected with viral DIO-IRES-ST-eGtACR1 and DIO-GCaMP6f and calcium activity was imaged while the animal was awake and head fixed on a treadmill. Individual PV cells (1-s illumination, 0.16 mW/μm$^2$) were sequentially suppressed and most (90.6%) of the cells exhibited reduced fluorescence when targeted but showed no consistent change when other neurons were targeted. No correlation between the direction or magnitude of a response and its distance from the targeted cell was observed.

Next, groups of four randomly selected PV cells were suppressed while simultaneously imaged (6-12 groups per experiment, 1-s illumination at 0.08 mW/μm$^2$). Suppression of ensembles was also selective, as the laser caused suppression in only the cells targeted by the holographic pattern. Spikes removed from endogenous neural activity were also recorded from IRES-ST-eGtACR1+ neurons. 3D-SHOT stimulation at 0.32 mW/μm$^2$ produced at least a 95% reduction in firing in >75% of IRES-ST-eGtACR1+ cells. These data demonstrated all-optical suppression of neural activity in multiple neurons across a large working volume.

The efficacy of holographic suppression increased with stimulation power, allowing one to either completely silence the activity of a neuron during a defined time-window at high power or to titrate a neuron's average firing rate with lower powers. Suppression appeared constant over the entire stimulation period, consistent with the observation that GtACR1-evoked photocurrents did not substantially desensitize. Suppression was repeatable over many trials without loss of efficacy or any apparent change in spontaneous firing rates of stimulated neurons. This demonstration of single neuron suppression using 3D-SHOT represents the second element in a bidirectional toolbox to control spatiotemporal patterns of neural activity.

Simultaneous or sequential exposures to activate or suppress activity can also be used for spatiotemporal control. For example, ST-ChroME and IRES-ST-eGtACR1 opsins were employed in the intact brain to create and edit spatiotemporal patterns of neural activity using the 3D-SHOT system to enable 3D holographic stimulation with high axial resolution in vivo. To validate spatial resolution, the physiological point-spread function (PPSF) was derived using targeted loose patch recordings from ST-ChroME$^+$ neurons in anesthetized mice at multiple focal planes (spot diameter: 20 μm; radial full-width at half-max: 11±3 μm, axial full-width at half-max: 28±4 μm).

To further demonstrate the ability to perform all-optical read-write using 3D-SHOT stimulation to generate spikes with high-fidelity, sub-millisecond temporal precision, and cellular resolution in full 3D, experiments were performed in primary somatosensory cortex (S1) of awake, head fixed mice on a treadmill. Mice expressed both GCaMP6s and ST-ChroME in excitatory neurons. To avoid failures or extra spikes, the minimum laser power needed for each cell to reliably drive spiking with short pulses was determined. The all-optical data matched in vivo physiology measurements, as neurons' optical response function reached 80% of saturation with 0.16±0.02 mW/μm$^2$.

Neurons located throughout a 550-μm×550-μm×100-μm volume (three imaging planes spaced 50 μm apart) were rapidly activated using an electrotuneable lens, well within the accessible volume of the stimulation. Neurons were stimulated one by one with a series of ten light pulses (5 ms, 30 Hz), and the effects were read out via GCaMP fluorescence. Generation of action potentials in this manner elicited large increases in GCaMP6s fluorescence.

Deconvolution of the calcium signal revealed that the temporal sequence of activation was reliable across many trials and repeatable in multiple animals. On average, spatial resolution remained high even in awake in vivo conditions, but failures and off-target activation could occur during rare episodes of brain motion. Such motion was easily identified post hoc, and trials in which motion coincided with photostimulation were excluded from analysis. In addition, holographic stimulation did not affect the running behavior of the subject animals.

From the description herein, it will be appreciated that that the present disclosure encompasses multiple embodiments which include, but are not limited to, the following:

1. An apparatus for holographic temporal focusing for 3D photo-activation, the apparatus comprising: (a) an illumination source configured to generate femtosecond pulses; (b) a phase mask generator downstream of the illumination source and configured as a phase mask; (c) a diffraction grating downstream of the illumination source; (d) a spatial light modulator (SLM) downstream of the diffraction grating; (e) the phase mask and the diffraction grating positioned for generation of a temporally focused pattern by spectral separation of the femtosecond pulses by the diffraction grating into individual components that propagate on separate optical paths; (f) wherein constructive interference reconstructs the femtosecond pulses at virtual images of the diffraction grating; and (g) wherein the femtosecond pulses are patterned by the spherical phase mask adjusted to matching dimensions of the SLM in Fourier space.

2. The apparatus of any preceding or following embodiment, wherein the phase mask generator is selected from the group consisting of a spherical lens and a spatial light modulator.

3. The apparatus of any preceding or following embodiment, further comprising: a 4f optical relay downstream of the diffraction grating and before the SLM.

4. The apparatus of any preceding or following embodiment, further comprising a rotating holographic diffuser downstream from the 4f optical relay configured to randomize a temporally focused beam in space and time and produce a custom temporally focused pattern.

5. The apparatus of any preceding or following embodiment, wherein a computed point cloud hologram places a copy of the temporally focused pattern at desired locations in the volume of interest as a 3D photostimulation pattern.

6. The apparatus of any preceding or following embodiment, further comprising: a tube lens downstream of the SLM; and an objective downstream of the tube lens; wherein the resulting 3D photostimulation pattern is demagnified by the tube lens and the objective.

7. The apparatus of any preceding or following embodiment, further comprising a fluorescence detector.

8. The apparatus of any preceding or following embodiment, wherein the fluorescence detector comprises: a movable stage allowing mechanical z-axis focus or defocus; an inverted microscope objective; an infrared filter; and a camera or detector.

9. An apparatus for 3D scanless holographic optogenetics with temporal focusing, the apparatus comprising: (a) an illumination source configured to generate femtosecond pulses; (b) a phase mask generator downstream of the illumination source and configured as a phase mask; (c) a diffraction grating downstream of the illumination source; (d) a 4f optical relay downstream of the diffraction grating; (e) a rotating gaussian holographic diffuser downstream of the 4f optical relay; and (f) a spatial light modulator (SLM) downstream of the diffraction grating; (g) wherein the SLM positioned in Fourier space generates a point-cloud hologram that replicates the phase mask at one or more target points in a volume image as a 3D photostimulation pattern.

10. The apparatus of any preceding or following embodiment, wherein the phase mask generator is selected from the group consisting of a spherical lens and a spatial light modulator.

11. The apparatus of any preceding or following embodiment, further comprising: a telescope lens downstream of the SLM; a tube lens downstream of the telescope lens; and an objective downstream of the tube lens; wherein the resulting 3D photostimulation pattern from the SLM is demagnified by the tube lens and the objective.

12. The apparatus of any preceding or following embodiment, further comprising: (a) a processor configured to control the illumination source, rotation diffuser, SLM and a detector; and (b) a non-transitory memory storing instructions executable by the processor; (c) wherein the instructions, when executed by the processor, perform steps comprising: (i) activation and pulse duration of the illumination source; (ii) rotation of the rotation holographic diffuser; (iii) generation of point cloud holograms; (iv) activity of the SLM; and (v) recording detection data of the detector; (d) wherein copies of the phase mask placed at one or more desired target locations and detected.

13. The apparatus of any preceding or following embodiment, further comprising: an imaging laser; and an imaging laser controller.

14. A method for 3D scanless holographic optogenetics with temporal focusing, the method comprising: (a) providing a volume of cells expressing one or more opsins; (b) forming a pattern of copies of temporally focused disc's of light targeted at one or more locations within the volume of cells, the temporally focused disc's patterned by the steps comprising: (1) applying a spherical phase pattern to Gaussian pulses from a femtosecond infrared laser with a first lens to generate a patterned beam; (2) decomposing the patterned beam in the spectral domain with a blazed diffraction grating so that each color propagates along a different pathway and a wave-field is generated; and (3) inputting the resulting wave-field into a lens system comprising a second and third spaced-apart lenses and a spatial light modulator (SLM) in its Fourier plane; (c) simultaneously activating of one or more targeted cells within the volume with the pattern of temporally focused discs of light; and (d) detecting the response of the cells of the volume of cells to exposure to the pattern of temporally focused discs of light.

15. The method of any preceding or following embodiment, further comprising: mapping networks of functionally connected neurons activated with exposure to different patterns of temporally focused discs of light.

16. The method of any preceding or following embodiment, the forming of patterns further comprising: randomizing a temporally focused beam in space and time with a rotating holographic diffuser to produce a custom temporally focused pattern; and applying the diffused beam to the spatial light modulator (SLM).

17. The method of any preceding or following embodiment, the forming of patterns further comprising: digitally patterning phase in the Fourier domain for operation as an all-optical convolution product.

18. The method of any preceding or following embodiment, wherein the SLM implements a custom phase mask computed to holographically target multiple locations in 3D with a point cloud; and wherein a replica of the temporally focused phase mask is placed at each target point of the hologram.

19. The method of any preceding or following embodiment, wherein the volume of cells expressing one or more opsins; comprises cells expressing a ST-ChroME sequence polynucleotide of SEQ ID NO: 1.

20. The method of any preceding or following embodiment, wherein the volume of cells expressing one or more opsins comprises cells expressing a pCAG-H2B-mRuby3-IRES-eGtACR1-ST sequence polynucleotide of SEQ ID NO: 2.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

Additionally, the 3D-SHOT technology described in this disclosure employs computer generated holography and the manner in which holography is used is referred to as "point cloud"—namely computer-generated holograms made of points distributed in 3D. Those skilled in the art will readily appreciate that there are various computer-generation software packages and techniques that are suitable for that purpose.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

What is claimed is:

1. An apparatus for holographic temporal focusing for 3D photo-activation, the apparatus comprising:

(a) an illumination source configured to generate femtosecond pulses;

(b) a phase mask generator downstream of the illumination source and configured as a phase mask;

(c) a diffraction grating downstream of the illumination source;

(d) a spatial light modulator (SLM) downstream of the diffraction grating;

(e) said phase mask and said diffraction grating positioned for generation of a temporally focused pattern by spectral separation of the femtosecond pulses by the diffraction grating into individual components that propagate on separate optical paths;

(f) wherein constructive interference reconstructs the femtosecond pulses at virtual images of the diffraction grating; and (g) wherein the femtosecond pulses are patterned by the spherical phase mask adjusted to matching dimensions of the SLM in Fourier space.

2. The apparatus of claim 1, wherein said phase mask generator is selected from the group consisting of a spherical lens and a spatial light modulator.

3. The apparatus of claim 1, further comprising:

a 4f optical relay downstream of the diffraction grating and before the SLM.

4. The apparatus of claim 3, further comprising:

a rotating holographic diffuser downstream from said 4f optical relay configured to randomize a temporally focused beam in space and time and produce a custom temporally focused pattern.

5. The apparatus of claim 1, wherein a computed point cloud hologram places a copy of the temporally focused pattern at desired locations in the volume of interest as a 3D photostimulation pattern.

6. The apparatus of claim 2, further comprising:

a tube lens downstream of the SLM; and an objective downstream of the tube lens;

wherein the resulting 3D photostimulation pattern is demagnified by the tube lens and the objective.

7. The apparatus of claim 1, further comprising a fluorescence detector.

8. The apparatus of claim 7, wherein said fluorescence detector comprises:

a movable stage allowing mechanical z-axis focus or defocus;

an inverted microscope objective;

an infrared filter; and a detector.

* * * * *